(12) United States Patent
Akkarakaran et al.

(10) Patent No.: US 11,375,339 B2
(45) Date of Patent: Jun. 28, 2022

(54) WAVEFORM REPORTING FOR POSITIONING

(71) Applicant: QUALCOMM Incorporated, San Diego, CA (US)

(72) Inventors: Sony Akkarakaran, Poway, CA (US); Alexandros Manolakos, San Diego, CA (US); Guttorm Ringstad Opshaug, Redwood City, CA (US); Peter Gaal, San Diego, CA (US); Juan Montojo, San Diego, CA (US); Joseph Binamira Soriaga, San Diego, CA (US); Tao Luo, San Diego, CA (US); Sven Fischer, Nuremberg (DE)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/813,311

(22) Filed: Mar. 9, 2020

(65) Prior Publication Data
US 2020/0296550 A1 Sep. 17, 2020

Related U.S. Application Data

(60) Provisional application No. 62/816,895, filed on Mar. 11, 2019.

(51) Int. Cl.
*H04W 4/029* (2018.01)
*G01S 5/14* (2006.01)
*G01S 5/02* (2010.01)

(52) U.S. Cl.
CPC ........... *H04W 4/029* (2018.02); *G01S 5/0221* (2013.01); *G01S 5/14* (2013.01)

(58) Field of Classification Search
CPC ........ H04W 4/029; G01S 5/0221; G01S 5/14; G01S 5/02; G01S 1/20; G01S 5/0036; G01S 1/0428; H04L 27/2602
(Continued)

(56) References Cited

U.S. PATENT DOCUMENTS 10,051,412 B2 * 8/2018 Shinotsuka ............... G01S 1/74
2012/0108175 A1 * 5/2012 Luo ..................... H04L 27/2691
455/63.1
(Continued)

FOREIGN PATENT DOCUMENTS

EP 3402258 A1 11/2018
GB 2124458 A 2/1984

OTHER PUBLICATIONS

International Search Report and Written Opinion—PCT/US2020/021885—ISA/EPO—dated Jun. 17, 2020.

*Primary Examiner* — Charles N Appiah
*Assistant Examiner* — Frank E Donado
(74) *Attorney, Agent, or Firm* — Qualcomm Incorporated

(57) ABSTRACT

Methods, systems, and devices for wireless communications are described. Techniques for implementing positioning schemes based on a waveform report are described. A wireless device may receive a waveform reporting request instructing the wireless device to measure a waveform. The wireless device may identify a set of reporting parameters for sampling the waveform, receive the waveform, and generate samples of the waveform based on the set of reporting parameters. The wireless device may transmit a waveform report that is generated based on the samples.

29 Claims, 15 Drawing Sheets

(58) Field of Classification Search
USPC ...................................................... 455/456.1
See application file for complete search history.

(56) References Cited

U.S. PATENT DOCUMENTS

| | | | |
|---|---|---|---|
| 2013/0329612 A1* | 12/2013 | Seo ...................... | H04B 7/2656 |
| | | | 370/280 |
| 2014/0349582 A1 | 11/2014 | Xiao et al. | |
| 2015/0133157 A1 | 5/2015 | Xiao et al. | |
| 2016/0014706 A1* | 1/2016 | Vajapeyam ......... | H04W 56/001 |
| | | | 370/328 |
| 2016/0337916 A1* | 11/2016 | Deenoo ............. | H04W 36/0088 |
| 2018/0027518 A1 | 1/2018 | Sugumaran et al. | |
| 2018/0254639 A1* | 9/2018 | Bell ...................... | H04B 5/0056 |
| 2018/0302873 A1* | 10/2018 | Kazmi .................. | H04W 24/10 |
| 2019/0037525 A1 | 1/2019 | Liu et al. | |
| 2019/0141696 A1* | 5/2019 | Kim ...................... | H04L 5/0055 |
| 2019/0166618 A1* | 5/2019 | Hugl ..................... | H04W 72/14 |
| 2019/0342874 A1* | 11/2019 | Davydov .......... | H04W 72/0413 |
| 2020/0137601 A1* | 4/2020 | Siomina ................ | H04W 24/10 |
| 2020/0169336 A1* | 5/2020 | Modarres Razavi ..... | G01S 5/14 |
| 2020/0177254 A1* | 6/2020 | Lee ...................... | H04B 7/0632 |

\* cited by examiner

WAVEFORM REPORTING FOR POSITIONING

CROSS REFERENCE

The present Application for Patent claims the benefit of U.S. Provisional Patent Application No. 62/816,895 by AKKARAKARAN, et al., entitled "WAVEFORM REPORTING FOR POSITIONING," filed Mar. 11, 2019, assigned to the assignee hereof, and expressly incorporated herein.

BACKGROUND

The following relates generally to wireless communications, and more specifically to waveform reporting for positioning.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

A UE and a base station may implement techniques for the base station and network to keep track of positioning of the UE. Positioning techniques in a wireless communications system can be improved.

SUMMARY

The described techniques relate to improved methods, systems, devices, and apparatuses that support waveform reporting for positioning. Generally, the described techniques provide for generating samples of a waveform and transmitting a waveform report based on the samples. A first wireless device may transmit a waveform reporting request instructing a second wireless device to measure a waveform. The second wireless device may identify a set of reporting parameters for sampling the waveform. The reporting parameters may correspond to a configuration which the second wireless device uses when sampling the waveform. For example, the reporting parameters may include one or more of a number of antennas, ports, a bandwidth of the waveform, an oversampling rate, etc. The reporting parameters may, in some cases, indicate how much processing the second wireless device performs to the waveform prior to or after generating the samples. In some cases, the first wireless device may transmit the waveform to the second wireless device, and the second wireless device may generate samples of the waveform based on the reporting parameters. The second wireless device may transmit a waveform report that is generated based on the samples to the first wireless device. In some cases, the waveform report may assist the first and second wireless devices in implementing efficient, more accurate, or complex positioning techniques.

A method of wireless communications by a wireless device is described. The method may include receiving a waveform reporting request instructing the wireless device to measure a waveform, identifying a set of reporting parameters for sampling the waveform, generating samples of the waveform based on the set of reporting parameters, and transmitting a waveform report that is generated based on the samples.

An apparatus for wireless communications by a wireless device is described. The apparatus may include a processor, memory in electronic communication with the processor, and instructions stored in the memory. The instructions may be executable by the processor to cause the apparatus to receive a waveform reporting request instructing the wireless device to measure a waveform, identify a set of reporting parameters for sampling the waveform, generate samples of the waveform based on the set of reporting parameters, and transmit a waveform report that is generated based on the samples.

Another apparatus for wireless communications by a wireless device is described. The apparatus may include means for receiving a waveform reporting request instructing the wireless device to measure a waveform, identifying a set of reporting parameters for sampling the waveform, generating samples of the waveform based on the set of reporting parameters, and transmitting a waveform report that is generated based on the samples.

A non-transitory computer-readable medium storing code for wireless communications by a wireless device is described. The code may include instructions executable by a processor to receive a waveform reporting request instructing the wireless device to measure a waveform, identify a set of reporting parameters for sampling the waveform, generate samples of the waveform based on the set of reporting parameters, and transmit a waveform report that is generated based on the samples.

In some examples of the method, apparatuses, and non-transitory computer-readable medium described herein, identifying the set of reporting parameters may include operations, features, means, or instructions for identifying at least one receive antenna of the wireless device, at least one port, a bandwidth of the waveform, an oversampling rate, or any combination thereof.

Some examples of the method, apparatuses, and non-transitory computer-readable medium described herein may further include operations, features, means, or instructions for processing the samples to generate a combined received energy, where the waveform report indicates the combined received energy.

In some examples of the method, apparatuses, and non-transitory computer-readable medium described herein, generating the samples of the waveform may include operations, features, means, or instructions for generating the samples of the waveform before or after performing UE processing.

In some examples of the method, apparatuses, and non-transitory computer-readable medium described herein, the UE processing may include a channel estimation, a pilot descrambling, removing a cyclic prefix, or a combination thereof.

In some examples of the method, apparatuses, and non-transitory computer-readable medium described herein, generating the samples of the waveform may include operations, features, means, or instructions for generating the samples of the waveform before or after performing channel estimation.

In some examples of the method, apparatuses, and non-transitory computer-readable medium described herein, the waveform report indicates whether the samples may be generated before or after performing channel estimation.

In some examples of the method, apparatuses, and non-transitory computer-readable medium described herein, generating the samples of the waveform may include operations, features, means, or instructions for generating the samples of the waveform before or after performing pilot descrambling.

In some examples of the method, apparatuses, and non-transitory computer-readable medium described herein, the waveform report indicates whether the samples may be generated before or after performing pilot descrambling.

In some examples of the method, apparatuses, and non-transitory computer-readable medium described herein, generating the samples of the waveform may include operations, features, means, or instructions for generating the samples of the waveform before or after removing a cyclic prefix from the waveform.

In some examples of the method, apparatuses, and non-transitory computer-readable medium described herein, the waveform report indicates whether the samples may be generated before or after removing the cyclic prefix.

In some examples of the method, apparatuses, and non-transitory computer-readable medium described herein, the waveform includes a positioning reference signal.

In some examples of the method, apparatuses, and non-transitory computer-readable medium described herein, the waveform report indicates at least one reporting parameter of the set of reporting parameters.

In some examples of the method, apparatuses, and non-transitory computer-readable medium described herein, the samples may be time domain samples, frequency domain samples, or both.

In some examples of the method, apparatuses, and non-transitory computer-readable medium described herein, the waveform report includes the samples of the waveform, information generated by processing the samples of the waveform, or both.

In some examples of the method, apparatuses, and non-transitory computer-readable medium described herein, the waveform report indicates whether the samples may be generated using a staggered comb or a de-staggered comb.

In some examples of the method, apparatuses, and non-transitory computer-readable medium described herein, generating the samples of the waveform may include operations, features, means, or instructions for generating the samples of the waveform on up to each symbol of a set of symbols of the waveform, on up to each tone of a set tones of the waveform, or both.

In some examples of the method, apparatuses, and non-transitory computer-readable medium described herein, generating the samples of the waveform may include operations, features, means, or instructions for generating the samples of the waveform on positioning reference signal symbols that may be a subset of symbols within a set of symbols of the waveform, on positioning reference signal tones that may be a subset of tones within a set tones of the waveform, or both.

In some examples of the method, apparatuses, and non-transitory computer-readable medium described herein, the report indicates a bitwidth of the samples.

In some examples of the method, apparatuses, and non-transitory computer-readable medium described herein, the report indicates a total number of the samples.

In some examples of the method, apparatuses, and non-transitory computer-readable medium described herein, identifying the set of reporting parameters may include operations, features, means, or instructions for receiving control signaling indicating a first parameter in the set of reporting parameters.

In some examples of the method, apparatuses, and non-transitory computer-readable medium described herein, identifying the set of reporting parameters may include operations, features, means, or instructions for determining a second reporting parameter in the set of reporting parameters based on the first parameter.

In some examples of the method, apparatuses, and non-transitory computer-readable medium described herein, identifying the set of reporting parameters may include operations, features, means, or instructions for selecting, by the wireless device, each reporting parameter in the set of reporting parameters.

In some examples of the method, apparatuses, and non-transitory computer-readable medium described herein, generating the samples of the waveform may include operations, features, means, or instructions for selecting a location of a direct current (DC) tone of the wireless device, and generating the samples of the waveform based on the selected location of the DC tone.

In some examples of the method, apparatuses, and non-transitory computer-readable medium described herein, the waveform report indicates a tone index or a tone frequency of the DC tone.

Some examples of the method, apparatuses, and non-transitory computer-readable medium described herein may further include operations, features, means, or instructions for determining that a second waveform does not arrive within a cyclic prefix of the waveform corresponding to a first fast Fourier transform window for generating the samples of the waveform, and generating second samples of the second waveform using a second fast fourier transform window that may be offset from the first fast Fourier transform window, where the waveform report may be generated based on the second samples.

In some examples of the method, apparatuses, and non-transitory computer-readable medium described herein, generating the samples of the waveform may include operations, features, means, or instructions for suspending or reducing a frequency of making timing corrections for a time period corresponding to a periodic reporting of the samples of the waveform.

In some examples of the method, apparatuses, and non-transitory computer-readable medium described herein, generating the samples of the waveform may include operations, features, means, or instructions for correcting timing prior for a time period corresponding to generating the samples of the waveform, where the waveform report indicates a timing adjustment for at least one sample of the samples of the waveform.

Some examples of the method, apparatuses, and non-transitory computer-readable medium described herein may further include operations, features, means, or instructions for suspending a debugging log or channel state information reporting for at least a time period corresponding to generating the samples of the waveform.

In some examples of the method, apparatuses, and non-transitory computer-readable medium described herein, the wireless device may be a user equipment or a base station, and the waveform report may be transmitted to a base station, a user equipment, or a location server.

In some examples of the method, apparatuses, and non-transitory computer-readable medium described herein, the waveform report indicates a timing control configuration of the samples.

In some examples of the method, apparatuses, and non-transitory computer-readable medium described herein, the waveform report indicates a number and identity of one or more base stations, transmit points, or both, reported in the waveform report.

A method of wireless communications is described. The method may include transmitting a waveform reporting request instructing a wireless device to measure a waveform, transmitting the waveform, and receiving, from the wireless device, a waveform report that is generated based on a set of reporting parameters for sampling the waveform.

An apparatus for wireless communications is described. The apparatus may include a processor, memory in electronic communication with the processor, and instructions stored in the memory. The instructions may be executable by the processor to cause the apparatus to transmit a waveform reporting request instructing a wireless device to measure a waveform, transmit the waveform, and receive, from the wireless device, a waveform report that is generated based on a set of reporting parameters for sampling the waveform.

Another apparatus for wireless communications is described. The apparatus may include means for transmitting a waveform reporting request instructing a wireless device to measure a waveform, transmitting the waveform, and receiving, from the wireless device, a waveform report that is generated based on a set of reporting parameters for sampling the waveform.

A non-transitory computer-readable medium storing code for wireless communications is described. The code may include instructions executable by a processor to transmit a waveform reporting request instructing a wireless device to measure a waveform, transmit the waveform, and receive, from the wireless device, a waveform report that is generated based on a set of reporting parameters for sampling the waveform.

In some examples of the method, apparatuses, and non-transitory computer-readable medium described herein, the waveform includes a positioning reference signal.

In some examples of the method, apparatuses, and non-transitory computer-readable medium described herein, the waveform report indicates at least one reporting parameter of the set of reporting parameters for sampling of the waveform.

Some examples of the method, apparatuses, and non-transitory computer-readable medium described herein may further include operations, features, means, or instructions for determining a location of the wireless device based on the waveform report.

Some examples of the method, apparatuses, and non-transitory computer-readable medium described herein may further include operations, features, means, or instructions for processing samples of the waveform included in the report based on a direct current (DC) tone indicated by the waveform report.

In some examples of the method, apparatuses, and non-transitory computer-readable medium described herein, the samples may be time domain samples, frequency domain samples, or both.

In some examples of the method, apparatuses, and non-transitory computer-readable medium described herein, the waveform report includes the samples, information generated by processing the samples of the waveform, or both.

Some examples of the method, apparatuses, and non-transitory computer-readable medium described herein may further include operations, features, means, or instructions for identifying at least one receive antenna, at least one port, a bandwidth of the waveform, an oversampling rate, or any combination thereof, indicated in the waveform report.

In some examples of the method, apparatuses, and non-transitory computer-readable medium described herein, the waveform reporting request indicates a first parameter of the set of reporting parameters, and the waveform report indicates at least one parameter of the set of parameters derived from the first parameter.

Some examples of the method, apparatuses, and non-transitory computer-readable medium described herein may further include operations, features, means, or instructions for generating a debugging log or channel state information based on the waveform report.

DETAILED DESCRIPTION

A base station may serve a user equipment (UE) within a coverage area. The base station or the core network may implement techniques for tracking the position of the UE, for example to assist mobility management, paging, or quality of directional, beamformed transmissions, among other reasons. The base station, as well as other neighboring base stations, may transmit a positioning reference signal (PRS) which is measured by the UE. The UE may report the measurements to the serving base station, and the serving base station, or other device, may estimate the position of the UE. Wireless devices described herein may implement techniques for transmitting a waveform report which is generated based on samples of a received waveform. By transmitting a report for the waveform, the network may implement enhanced positioning techniques. The base station may be able to generate an approximation of the waveform as received at the UE based on the waveform report and provided samples of the waveform. Although some examples described herein relate to a UE generating a waveform report for a received downlink transmission, the techniques described herein for waveform reporting may be generally applicable to any direction of communication between two wireless devices.

In some examples, a UE may identify a set of reporting parameters for generating the waveform report. The reporting parameters may include, for example, one or more of receive antennas, ports, a bandwidth of the waveform, an oversampling rate, or a combination thereof. In some cases, the UE may sample the waveform before or after removing a cyclic prefix from the waveform, before or after FFT (e.g., in time-domain or in frequency-domain), before or after pilot descrambling, or before or after performing channel estimation, among other configurations. The UE may indicate the reporting parameters to the base station with the set of samples. For example, the reporting parameters may be included in a header of the waveform report, where the samples may be transmitted in the payload. The reporting parameters may be transmitted so that the base station can determine how the UE sampled the waveform, which may provide additional context to the waveform report and the samples.

Aspects of the disclosure are initially described in the context of a wireless communications system. Aspects of the disclosure are further illustrated by and described with reference to apparatus diagrams, system diagrams, and flowcharts that relate to waveform reporting for positioning.

Figure 1:
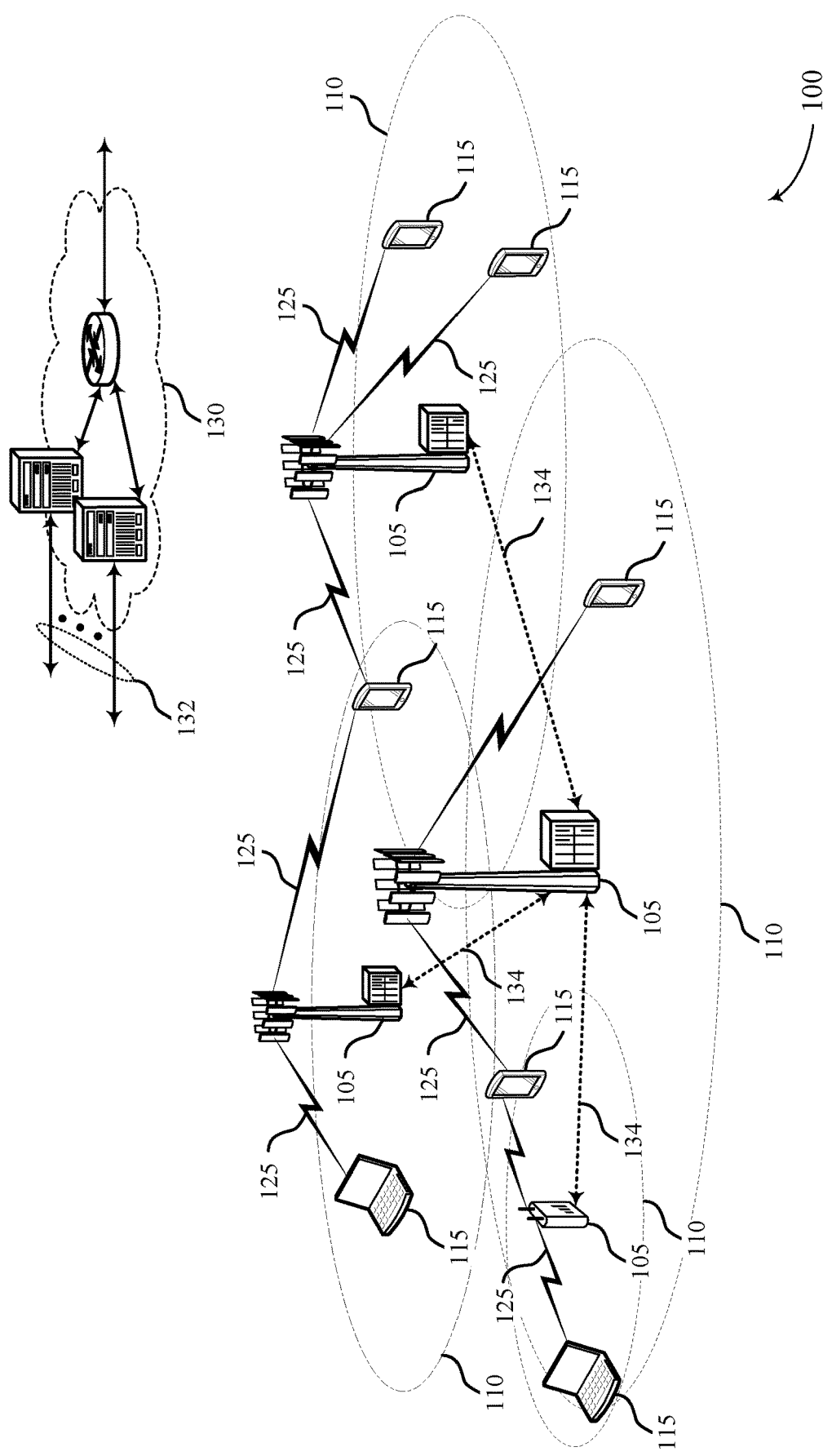
FIG. 1 illustrates an example of a system for wireless communications in accordance with aspects of the present disclosure.

FIG. 1 illustrates an example of a wireless communications system 100 that supports waveform reporting for positioning in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of Ts=1/30,720,000 seconds. Time intervals of a communications resource may be organized according to radio frames each having a duration of 10 milliseconds (ms), where the frame period may be expressed as Tf=307, 200 Ts. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Base stations 105 and UEs 115 described herein may implement techniques for improved positioning techniques using a waveform report. For example, a base station 105 may transmit a signal to a UE 115, such as a PRS. The UE 115 may be configured with, or select itself, a set of reporting parameters for sampling a waveform of the signal. The UE 115 may generate samples of the waveform based on the reporting parameters. The UE 115 may then transmit a waveform report that is generated based on the samples. In this way, the UE 115 may transmit samples of the waveform and information related to the sample-taking procedure so that the waveform can be recreated at the base station 105. The base station 105 may use this information of the received downlink waveform to implement positioning techniques.

Figure 2:
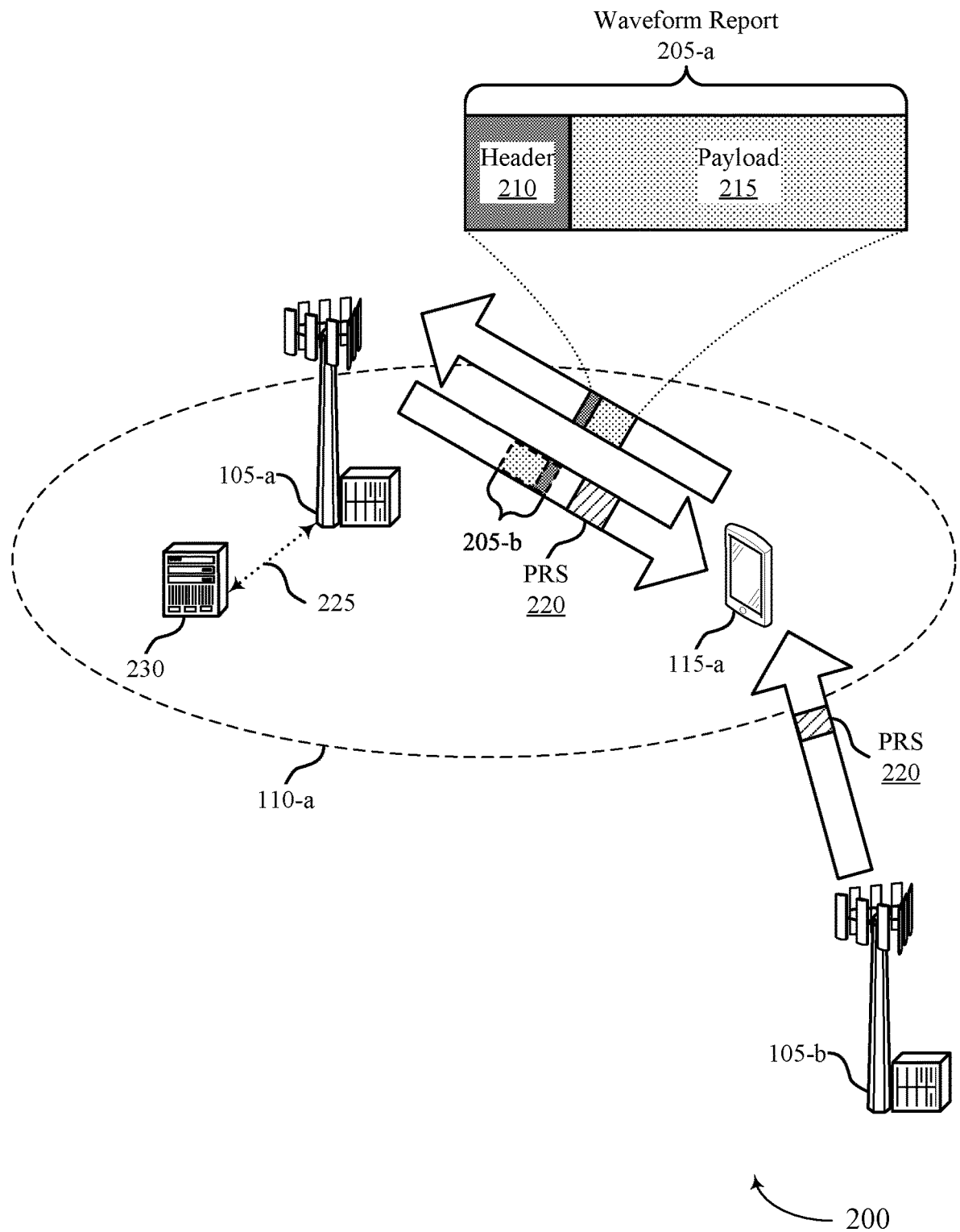
FIG. 2 illustrates an example of a wireless communications system in accordance with aspects of the present disclosure.

FIG. 2 illustrates an example of a wireless communications system 200 that supports waveform reporting for positioning in accordance with aspects of the present disclosure. In some examples, wireless communications system 200 may implement aspects of wireless communication system 100 and may include UE 115-a and base station 105-a, which may be respective examples of a UE 115 and a base station 105 described with reference to FIG. 1.

Base station 105-a may serve UEs 115 within coverage area 110-a, including UE 115-a. The wireless communications system 200 may support beamformed communications, where base station 105-a and UE 115-a communicate using directional, beamformed transmissions. For this and other reasons (e.g., mobility management, etc.), base station 105-a may keep track of the location of UE 115-a and other UEs 115. Base station 105-a and UE 115-a may implement a variety of techniques to support location management of wireless devices within the wireless communications system. In some examples, base station 105-a and other, neighboring base stations 105 may transmit a signal of interest, such as a positioning reference signal (PRS) 220. UE 115-a may receive and perform measurements on the signal of interest (e.g., PRSs 220) from the base stations 105. These measurements may include observed time difference of arrival (OTDOA) measurements, such as a reference signal time difference (RSTD) estimate.

UE 115-a may report the measurements or estimates made from the PRSs 220 to base station 105-a. In some cases, base station 105-a may use the measurements or estimates to detect, or estimate, the positioning of UE 115-a. Additionally, or alternatively, UE 115-a may estimate its positioning based on the measurements and transmit an estimation of positioning to base station 105-a. In some examples, the estimates or measurements may be sent to a location management function (LMF) 230, and the LMF 230 may estimate the location or positioning of UE 115-a. In some cases, the estimates or measurements may be sent to the LMF 230 via a backhaul link 225.

UE 115-a and base station 105-a may implement techniques to support enhanced positioning schemes and techniques. For example, base station 105-a may transmit a signal of interest (e.g., the PRS 220) to UE 115-a, and UE 115-a may report up to the entire received waveform to base station 105-a, for example in waveform report 205-a. Reporting the entire waveform may higher accuracy, higher complexity positioning schemes. In some systems, a UE 115 may process the received waveform to determine and report only a simplified measurement or characteristic of the signal, such as reference signal received power (RSRP), a reference signal strength indicator (RSSI), a reference signal received quality (RSRQ), etc.

A waveform report 205 may include samples of the waveform of the signal as received by UE 115-a (e.g., in a payload 215 of the waveform report 205), which can be used to reconstruct an approximation of the received waveform. In some examples, the signal sampled by UE 115-a to generate the waveform report 205 may be a PRS 220. In some cases, UE 115-a may be configured to report received waveforms for other signals, such as downlink control signaling, downlink data signaling, etc. In some cases, the waveform report 205 may also include aspects of the more processed measurements or characteristics (e.g., such as RSRP, RSSI, RSRQ, etc.) in addition to the samples of the waveform. In some cases, UEs 115 may periodically generate a waveform report 205. For example, a base station 105 may periodically transmit a signal, such as a PRS, which the UE 115 may sample to generate the waveform report. Or, in some cases, a UE 115 may be dynamically triggered to transmit a waveform report. For example, a base station 105 may transmit a waveform reporting request to the UE 115 and transmit the waveform subsequently. The request may be transmitted by RRC message, MAC-CE, or DCI. For example, a MAC-CE or DCI may index into a set of previously RRC-configured waveform-reporting settings or configurations. The UE 115 may sample the waveform and generate the waveform report in response to the waveform reporting request. Additionally, other occasions or triggers for waveform reporting may be implemented or configured, including event triggers, for example triggers based solely on an event at the UE 115 without the need for a command from the gNB (e.g., base station 105) or the network.

A waveform report 205 may include time domain samples, frequency domain samples, or both. Time domain samples in waveform report 205-a may include samples of the waveform of the signal as received by UE 115-a, prior to UE 115-a performing a Fast Fourier Transform (FFT). Frequency domain samples in waveform report 205-a may include samples of the waveform of the signal after UE 115-a performs an FFT on the received signal to transform the signal into the frequency domain. In some cases, UE 115-a may discard a cyclic prefix of the signal prior to performing the FFT and taking the frequency domain samples. In some examples, the frequency domain samples may include samples across multiple tones within a single symbol period. In some cases, the time domain samples may include samples for a single tone for a fraction of a symbol period, a single symbol period, or across multiple symbol periods. UE 115-a may generate samples (e.g., time domain samples or frequency domain samples) for one or more symbol periods or one or more resource elements where UE 115-a received a downlink signal from base station 105-a.

UE 115-a may indicate which parameters were used to receive, sample, or process the waveform of the received signal. These parameters may be referred to as reporting parameters. UE 115-a may indicate the reporting parameters to indicate to base station 105-a how UE 115-a obtained the samples and generated waveform report 205-a. For example, the reporting parameters may describe a configuration used by UE 115-a to take the samples of the waveform of a received signal. Base station 105-a may use these reporting parameters to analyze the samples included in waveform report 205-a. UE 115-a may include an indicator for any one or more of the reporting parameters. In some cases, some reporting parameters may be explicitly indicated or implicitly indicated. In some cases, indicators for the reporting parameters may be included in a header 210 of the waveform report 205. In some cases, the parameters may be indicated via RRC signaling, or indicated to base station 105-a via some other signaling.

In some examples, the reporting parameters may include a number of one or more antennas or ports used to receive the signal. UE 115-a may receive the signal using one or more antennas, and UE 115-a may include measurements or samples for any number of those antennas in the payload 215. In some cases, the measurements for the different receive antennas or ports may be reported individually, or a set of the antenna measurements may be combined into a single measurement.

In some cases, the reporting parameters indicated in the header 210 may include an indicator of a bandwidth. For example, UE 115-a may indicate which tones are included in the measurements or samples. In some cases, UE 115-a may generate samples for signals received on a set of resource elements which may or may not be contiguous in the time domain or frequency domain. In some examples, the parameters indicated in the header 210 may include an oversampling rate for time domain signal reporting (e.g., reporting time domain samples).

In some examples, the reporting parameters indicated in the header 210 may include a location of a direct current (DC) tone when performing sampling (e.g., for time domain sample reporting). The DC tone may be, in an example, a center frequency for the system bandwidth. In some examples, the location of the DC tone may be indicated with respect to a reference point. In some cases, the reference point may be the center frequency for the system bandwidth, a starting point or ending point of a bandwidth part, or a center frequency of a bandwidth part. In some cases, the reference point may be configured for the UE 115, such as via RRC signaling. In the wireless communications system 200, a transmitting device (e.g., a UE 115 or a base station 105) may generate a signal to be transmitted using a DC tone. A device receiving the signal may assume a DC tone when receiving and processing the received signal. In some conventional systems, the transmitting device may signal the DC tone used to generate the transmission. For example, a base station 105 may signal the downlink DC tone for downlink transmissions, and a UE 115 may signal the uplink DC tone for uplink transmissions. The wireless communications system 200 may further support a receiving device to indicate the DC tone used to receive the signal in a waveform report 205. For example, base station 105-a may transmit a downlink signal to UE 115-a using a first DC tone, and UE 115-a may receive the downlink signal using a second DC tone, where the first DC tone and the second DC tone may be the same in some cases or may be different in other cases. UE 115-a may generate the waveform report 205 for the received waveform of the signal and include an indicator of the second DC tone used to receive the signal in the header 210 of the waveform report 205.

Base station 105-a may use the location of the DC tone of the receiving UE 115 (e.g., UE 115-a) to process reported time domain samples. In some cases, any change in DC tone may result in a phase ramp in the time domain, which may affect the accuracy of base station 105-a processing the time domain samples, if the base station 105 is unaware of the change. The techniques described herein may provide accurate and enhanced DC tone location reporting. In some cases, the DC tone location may be outside of the resource grid of a component carrier. For example, with multiple component carriers served by a common Radio Frequency front-end, UE 115-a may not even be configured for some of the component carriers. A conventional UE 115 would therefore not be able to indicate the location of the DC tone. However, UE 115-a may be configured to specify values outside of the resource grid. In some cases, UE 115-a may use band-specific indexing such as an Absolute Radio Frequency Channel Number (ARFCN). The ARFCN scheme may be implemented with a tone index at a specified (e.g., by base station 105-a), configured (e.g., by a network entity, in some cases include base station 105-a), or selected (e.g., by UE 115-a) numerology within a frequency range identified by the ARFCN. Additionally, or alternatively, UE 115-a may indicate an absolute frequency of the DC tone (e.g., to a certain precision). The DC tone may change over the duration of the waveform that is being reported, for example, if the occupied bandwidth changes due to frequency hopping across symbols or slots, or due to bandwidth-part (BWP) switching or cross-carrier scheduling. In this case, the DC tone used for each duration may be indicated, together with indication of the time instants (e.g., indicated by indices of slots, OFDM symbols, chips, etc.) at which the DC tone changed.

In some examples, the reporting parameters in the header 210 may include an indicator related to whether the report was generated directly from the received signal, or whether the signal was slightly processed before generating the report. For example, UE 115-a may indicate whether the samples were generated for individual time-frequency resources or energy of combined time-frequency resources. For example, UE 115-a may receive a signal on a first tone and a second tone in a symbol period and generate individual samples for the first tone and the second tone, or UE 115-*a* may generate samples for a combined energy of the first tone and the second tone.

In some cases, the reporting parameters may include an indicator of whether the samples are from before or after UE 115-*a* generates a channel estimate. In some cases, the parameters may include an indicator of whether UE 115-*a* applied a frequency-tracking correction. In some cases, UE 115-*a* may report a channel estimate per tone or report the entire channel. In some cases, UE 115-*a* may report just samples of the waveform instead of the channel estimates.

In some examples, the reporting parameters may include an indicator of whether the samples correspond to de-staggered resource elements as opposed to separate OFDM symbols with staggered frequency-domain combs. In some cases, UE 115-*a* may report each resource element across each OFDM symbol when reporting OFDM symbols with staggered combs. When reporting de-staggered resource elements, UE 115-*a* may combine the signal transmitted across multiple OFDM symbols into a single symbol. When combined, the combined signal may have the signal of interest (e.g., a PRS or a CSI-RS) present across all of the tones to represent the whole channel in one symbol period.

In some cases, multiple gNBs of interest may transmit the signal of interest on the same OFDM symbols on frequency division multiplexed staggered combs. In this example, the destaggering operation may be applied separately for each gNB of interest, and the waveform report may include a separate waveform for each gNB. The set of gNBs of interest may be configured or autonomously determined by the device producing the waveform report and may be reported back together with the report.

In some cases, the reporting parameters may include an indicator of whether UE 115-*a* took samples of the signal before or after descrambling a pilot of the signal. In some cases, base station 105-*a* may apply a fixed scrambling sequence on the tones. UE 115-*a* may either descramble the fixed scrambling sequence before taking the samples or take the samples of the waveform as received (e.g., without applying the descrambling). In some cases, if UE 115-*a* is taking a channel estimate, UE 115-*a* may descramble before taking the channel estimate. For some time domain signal sample reporting, UE 115-*a* may include an indicator in the header 210 of whether UE 115-*a* took the samples before or after stripping a cyclic prefix from the signal.

In some examples, UE 115-*a* may generate a waveform report 205 for any OFDM symbol and tone or only PRS symbols and tones. UE 115-*a* may include an indicator in the header 210 of whether samples correspond to a PRS 220, other signals, or a combination of the PRS 220 and other signals. UE 115-*a* may include an indicator of which symbols or slots are reported.

In some examples, UE 115-*a* may include an indicator of a bitwidth of samples in the reporting parameters in the header 210. The bitwidth may be based on the Physical channels carried (e.g., an identifier of PRS, if any, in the samples). The bitwidth may correspond to a granularity of measuring the sample. For example, the bitwidth may be a number of bits used to represent a measurement or a sample. The more bits included in a bitwidth, the more precise UE 115-*a* can be to indicate a measurement or sample. For example, with more bits in the bitwidth, UE 115-*a* may be able to more precisely indicate a signal strength of the received signal at a sampling occasion. The bitwidth, along with a number of samples, may correspond to an accuracy or granularity of the overall sampling. The number of samples may correspond to the number of samples taken (e.g., in the time domain or frequency domain), where the bitwidth may correspond to the accuracy of those samples. Therefore, with a high number of samples and a high bitwidth, the samples may be able to accurately represent the received waveform of the signal. In some cases, UE 115-*a* may explicitly indicate a number of samples (e.g., as a parameter in the header 210). In some cases, UE 115-*a* may implicitly indicate the number of samples, and base station 105-*a* may infer the number of samples, for example based on some of the other parameters.

In some cases, UE 115-*a* may indicate, via an indicator for the reporting parameters in the header 210, a timing control configuration for samples. This may correspond to an FFT window adjustment as described in FIG. 3. In some cases, UE 115-*a* may include, in the header 210, an indicator of a number and identity (e.g., a cell ID) of base stations 105 or PRS transmit points which are reported in the waveform report 205. For example, UE 115-*a* may make measurements and take samples of signals transmitted by both base station 105-*a* and base station 105-*b*. In waveform report 205-*a*, UE 115-*a* may include an indicator of base station 105-*a* and an indicator of base station 105-*a* in the header 210, where the payload 215 may include the samples for the signal transmitted by base station 105-*a* and the samples for the signal transmitted by base station 105-*b*. In some examples, the parameters described here may be applied and indicated per-cell or per-transmission point. For example, in some cases UE 115-*a* may apply a first set of parameters when generating samples for base station 105-*a* and a second set of parameters when generating samples for base station 105-*b*. UE 115-*a* may apply different values for parameters corresponding to, for example, channel estimation tones or de-staggered OFDM symbols, among other parameters. In some cases, channel estimation and de-staggering may be operations done for each PRS (e.g., for each PRS transmission point ID). In some cases, a waveform report 205 may include samples and parameters for multiple base stations 105, or UE 115-*a* may transmit a waveform report 205 for each base station 105.

In some cases, some of these parameters or may be configured by base station 105-*a*. In an example, base station 105-*a* may configure one or more of these parameters, for example via an RRC message. Additionally, or alternatively, UE 115-*a* may select the values or configurations for the parameters. In some cases, UE 115-*a* may select the parameters from a gNB-configured subset of options. In some cases, some parameters may be pre-specified, or dependent, on a selection of another parameter. For example, for a higher sampling rate, a lower bitwidth may be selected (e.g., by UE 115-*a* or base station 105-*a*) to prevent excessive reporting overhead. UE 115-*a* may indicate parameter selections or configurations in the header 210, which may be transmitted with the reported samples (e.g., transmitted in the payload 215) in waveform report 205-*a*. Additionally, other than the parameters which may be used (e.g., required) for interpretation of the reported waveform (e.g., the bandwidth, bitwidth, sampling rate, etc.), the device generating the waveform report may also include other receiver parameters. These other receiver parameters may, in some cases, not be required but may aid in better processing of the reported waveform. In some cases, these parameters may include gain states of the amplifiers (such as low noise amplifiers (LNAs)), a number of antenna elements, analog beamforming weights, channel estimation parameters such as noise thresholding of detected taps, etc. Such reporting may be optional. This and other reporting modes may be based on UE capabilities, including new capability reports introduced specifically to indicate waveform reporting capability.

In some cases, the waveform report 205 may be applied for other uses in addition to enhanced positioning techniques. For example, a base station 105 may replicate UE reception functionality using the received samples. In some cases, a base station 105 may reduce the frequency of CSI reporting when waveform reporting is enabled, since the base station may compute CSI using the reported waveform. Note that waveform reporting may cause a heavy traffic load, and although CSI reporting may be a small fraction of this traffic load, it may still be beneficial to reduce it. For example, waveform reporting may allow a reduction in the control channel overhead, by either reducing the CSI reporting or including CSI as part of the waveform report payload (e.g., along with other waveform report header parameters such as bitwidth, etc. described herein). In a similar manner, acknowledgments transmitted on uplink channel for HARQ operation of downlink traffic may also be reduced or eliminated, if the gNB or core network server can process the reported waveform and estimate whether the UE 115 would have decoded it based on channel quality metrics such as SINR. Or, the base station 105 may attempt to replicate the UE decoder functionality.

In some cases, UEs 115 and base stations 105 may log internal waveforms, and these internally-logged waveforms may be used for debugging. In some cases, these internally-logged waveforms may be used for localized testing performed separately at the UE 115 and base station 105. However, in some cases, waveform reporting may enable these devices to exchange the internally-logged waveforms in a waveform report 205. In some cases, this may lead to a more unified framework for waveform reporting. Techniques for reporting internally-logged waveforms may be enabled for both normal operation and testing modes. It may be used both for UE 115 and base station 105 local testing as well as inter-operational testing.

Additionally, it may be noted that waveform reporting may lead to high overhead on the link on which the reports are transmitted (e.g., uplink when UE reports its received DL waveform to the gNB or to a core network entity such as an LMF). However, other traffic requirements may also generate such high overhead, for example, the need to offload virtual-reality or augmented-reality video or image data from UE to a server for faster processing. The waveform reporting may be enabled in conjunction with presence of such traffic, to obtain trunking efficiency. Alternatively, the waveform reporting may be disabled in presence of such traffic, so as to prevent excessive loading. The choice between these alternatives may depend on many factors, including the loading caused by each of these reporting types.

In some cases, waveform reporting may enable easier gNB and LMF 230 upgrades. In some cases, a low capability or low performance gNB or server may perform simpler processing of the reported waveforms. The low capability or low performance gNB or server may be replaced with a higher performance gNB or server, which may still work on the same waveforms. The higher performance gNB or server may be configured to process more detailed reports (e.g., per-receive antenna reports instead of combined energy reports), but the requesting of the detailed reports may be implemented based on configuration changes in accordance with the air interface specification.

Other devices may also implement waveform reporting. The waveform reporting techniques described herein may not be limited to waveform reporting by a UE 115 and may, in some cases, be extended to reports from other nodes. For example, base stations 105, such as base station 105-a, may report received uplink waveforms as well. For example, when UE 115-a transmits a signal to base station 105-a, base station 105-a may report the waveform of the signal from UE 115-a. In some cases, base station 105-a may transmit a waveform report 205 (e.g., such as waveform report 205-b) back to UE 115-a, to a location measurement unit (LMU), or a positioning function (e.g., the LMF 230 or an enhanced serving mobile location center (eSMLC)). In some cases, base station 105-a may report to a network server a consolidation of the base station-generated waveform report 205 with waveform reports 205 generated by served UEs 115. For example, base station 105-a may report both waveform report 205-a and waveform report 205-b to a network server (e.g., an LMU, LMF, eSMLC, etc.). In some cases, a base station 105 reporting waveforms to a UE 115 may restrict the measurement to an allotted bandwidth of the UE 115. For example, waveform report 205-b may only correspond to a bandwidth allotted to UE 115-a. Since the unalloted bandwidth may carry data or control information intended for other UEs, such a limitation may be implemented to satisfy privacy policy rules.

In some cases, reports from multiple base stations 105 may be needed to determine positioning information. For example, if transmitted to a UE 115, the multiple reports may all be routed through the serving base station of the UE 115. The multiple reports may be sent over an Xn interface or sent via the core network. In some cases, reporting may be restricted to a limited number of base stations 105, such as only serving base stations 105. If a base station has multiple remote radio heads (RRHs), a sample stream from each RRH may be reported, which may provide positioning information.

Figure 3:
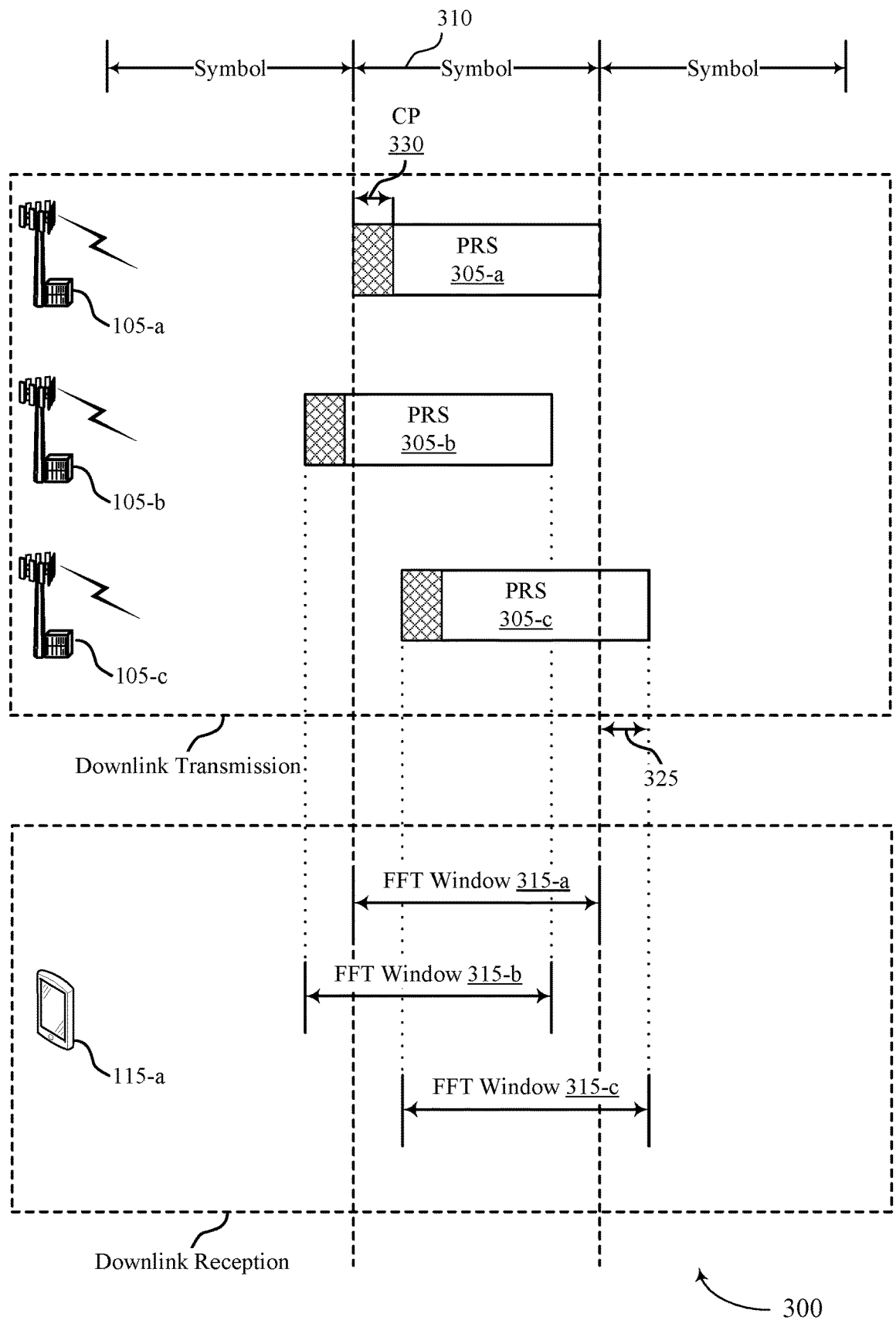
FIG. 3 illustrates an example of a fast Fourier transform (FFT) window configuration in accordance with aspects of the present disclosure.

FIG. 3 illustrates an example of an FFT window configuration 300 that supports waveform reporting for positioning in accordance with aspects of the present disclosure. In some examples, the FFT window configuration 300 may implement aspects of wireless communication system 100 or 200 and may be implemented by a wireless device, which may be an example of a UE 115 or a base station 105 described with reference to FIGS. 1 and 2.

Base station 105-a may serve UE 115-a. Base station 105-b and base station 105-c may be neighboring base stations 105 to base station 105-a and may or may not be examples of secondary cells. Each base station 105 may transmit a PRS 305. UE 115-a may receive the PRSs 305 and generate a sample a waveform for each PRS 305. UE 115-a may transmit a waveform report to base station 105-a as described with reference to FIG. 2.

An FFT window 315 may usually correspond to the timing of the serving cell (e.g., base station 105-a). In some cases, an FFT window 315 may span the duration of a symbol period 310. As described above, positioning may use a PRS 305 received from each of multiple base stations 105. UE 115-a may be geographically closer to some base stations 105 than others. For example, UE 115-a may be closer geographically to base station 105-b, while UE 115-a may be farther away from base station 105-c. The distance between UE 115-a and the base stations 105 may result in different propagation delays for transmissions between UE 115-a and the base stations 105. Therefore, some of the PRS 305 may arrive at different times and, in some cases, not arrive within the cyclic prefix 330 corresponding to the FFT window 315 of the serving cell (e.g., FFT window 315-a). For example, PRS 305-b may arrive late a propagation delay 325. The propagation delay 325 may be longer than the cyclic prefix 330. Therefore, UE 115-a may not receive the full PRS 305 within FFT window 315-a.

Therefore, UE 115-a may perform multiple FFTs with different window positions. UE 115-a may report up to all resulting frequency-domain waveforms from the received signals. For example, UE 115-a may perform an FFT in FFT window 315-a, 315-b, and 315-c. UE 115-a may receive PRS 305-a, 305-b, and 305-c in those FFT windows 315, respectively. UE 115-a may then generate samples for each of the PRSs 305 and report the resulting frequency-domain waveforms in one or more waveform reports as described in FIG. 2. The positions of the FFT windows 315 may be configured or determined and reported back by UE 115-a based on a detected timing of PRS from the multiple base stations 105. For example, UE 115-a may receive a first PRS 305 from base station 105-b, determine a timing of transmission from base station 105-b and configure an FFT window 315 for transmissions from base station 105-b, and apply the configured FFT window (e.g., FFT window 315-b) for a second PRS 305-b received from base station 105-b (e.g., at a later time).

Timing corrections may be made based on TA commands or UE-autonomous corrections. For accurate processing of reported waveforms, UE 115-a may determine, manage, or record the exact moment or time at which timing adjustments were applied. In some cases, UE 115-a may suspend timing corrections for the duration of the report, UE 115-a may include the timing corrections in waveform report with the samples. For example, the timing corrections information may be included as a reporting parameters in the header of the waveform report.

Figure 4:
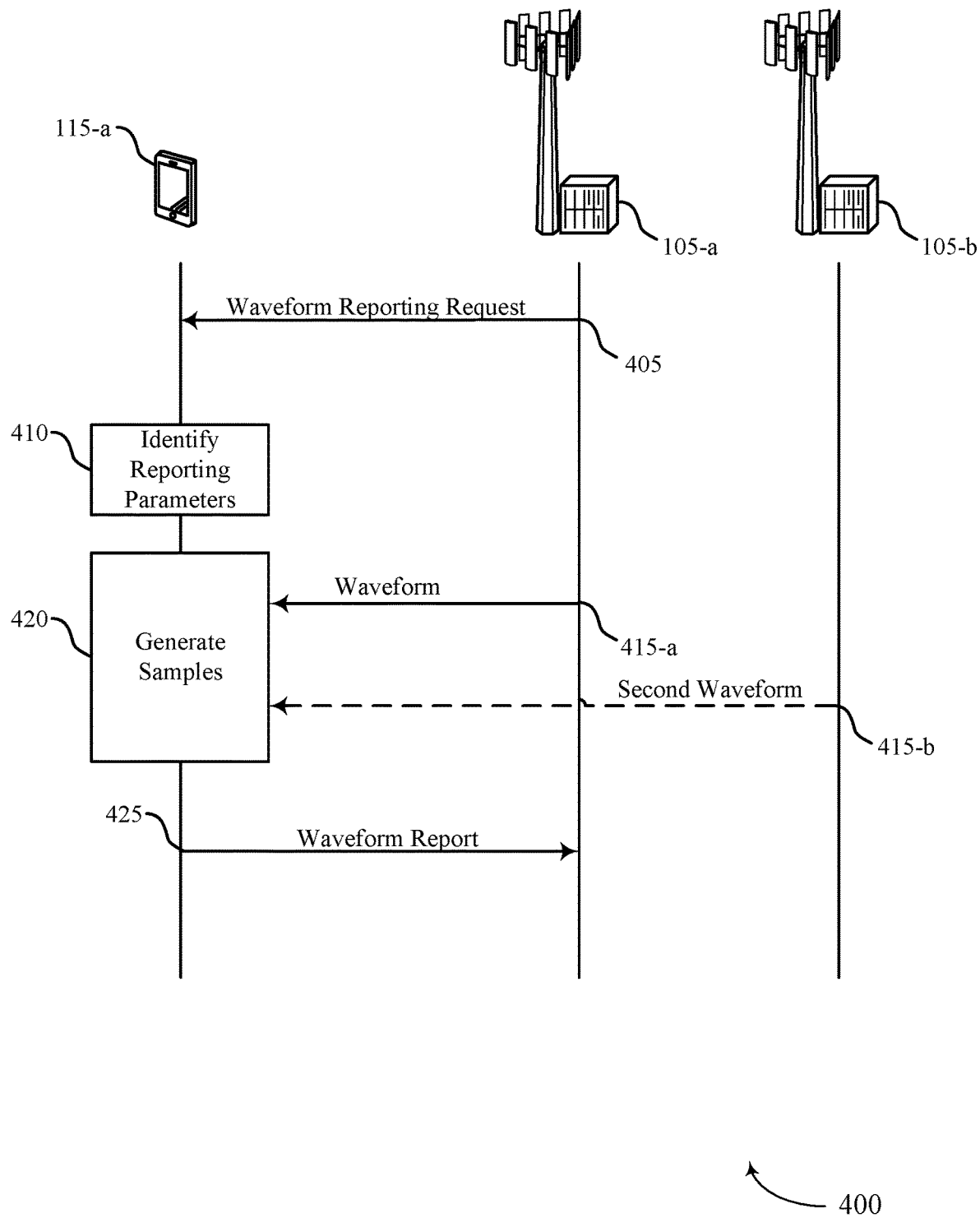
FIG. 4 illustrates an example of a process flow in accordance with aspects of the present disclosure.

FIG. 4 illustrates an example of a process flow 400 that supports waveform reporting for positioning in accordance with aspects of the present disclosure. In some examples, process flow 400 may implement aspects of wireless communication system 100. Process flow 400 may include UE 115-a, base station 105-a, and base station 105-b of FIGS. 2 and 3. UE 115-a may be an example of a UE 115 as described herein, and base stations 105-a and 105-b may each be an example of a base station 105 as described herein. Base station 105-a may be the serving cell of UE 115-a, and base station 105-b may be an example of a neighboring cell. As described herein, UE 115-a and the base stations 105 may implement techniques to utilize a waveform report for enhanced positioning techniques.

At 405, base station 105-a may transmit a waveform reporting request instructing a wireless device (e.g., UE 115-a) to measure a waveform. UE 115-a may receive the waveform reporting request instructing UE 115-a to measure the waveform. At 410, UE 115-a may identify a set of reporting parameters for sampling the waveform. In some cases, identifying reporting parameters may include identifying, for example, at least one receive antenna of UE 115-a, at least one port, a bandwidth of the waveform, an oversampling rate, or a combination thereof.

As described in FIG. 2, UE 115-a may, in some cases, perform measurements of multiple signals (e.g., PRS signals) from multiple different base stations to determine positioning information. For example, UE 115-a may also measure a waveform from a neighboring base station 105, such as base station 105-b, in addition to a waveform from the serving base station 105 (e.g., base station 105-b). At 415-a, base station 105-a may transmit the waveform to UE 115-a. At 415-b, base station 105-b may transmit a second waveform to UE 115-a. At 420, UE 115-a may generate samples of the waveform based on the set of reporting parameters.

In some cases, UE 115-a may determine that the second waveform does not arrive within a cyclic prefix of the waveform corresponding to a first FFT window for generating samples of the waveform. UE 115-a may generate second samples of the second waveform using a second FFT window that is offset from the first FFT window. An example of the FFT window configurations may be described with reference to FIG. 3.

At 425, UE 115-a may transmit a waveform report that is generated based on the samples. In some cases, the waveform report may be generated based on the second samples for the second waveform.

Figure 5:
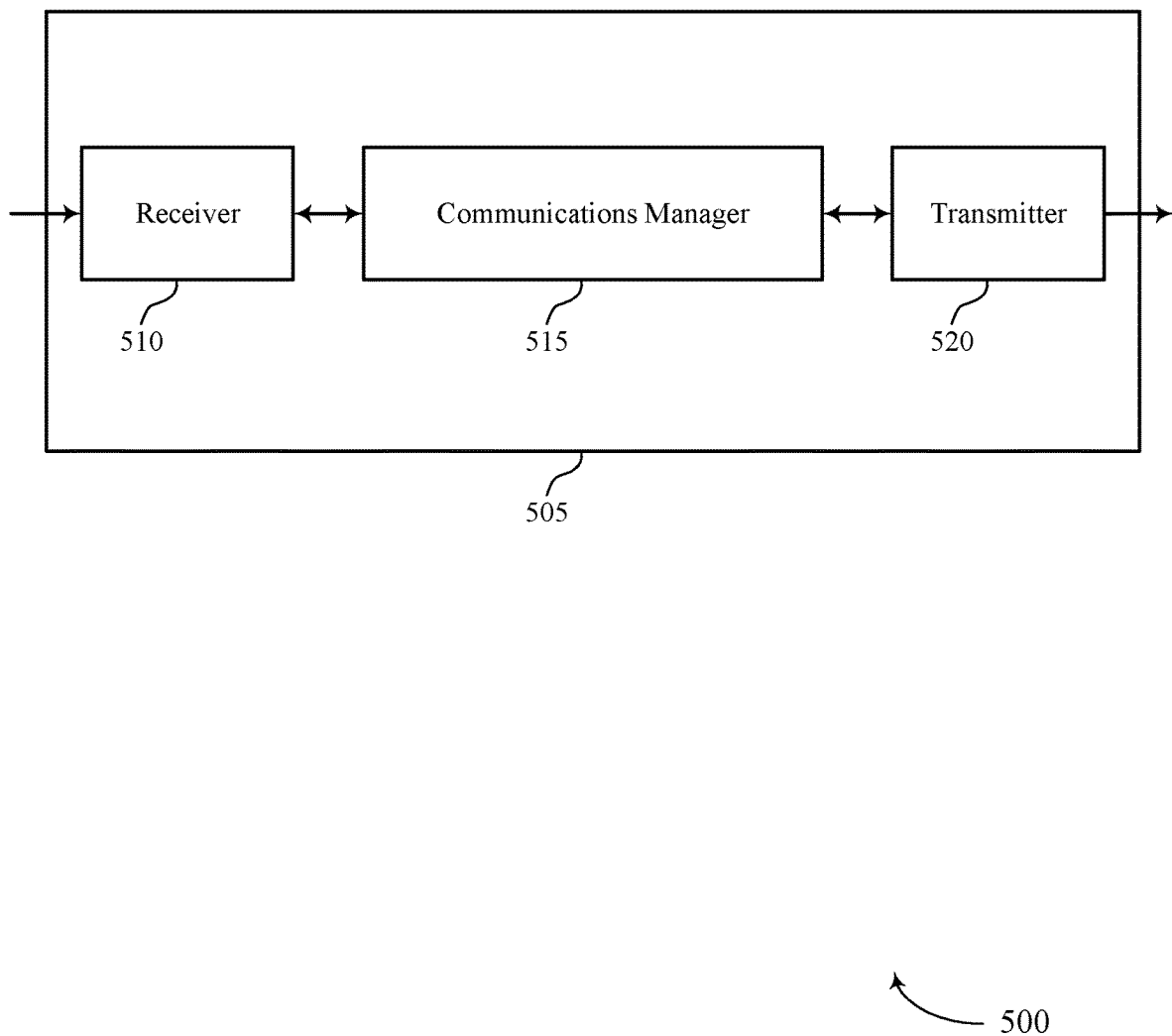
FIGS. 5 and 6 show block diagrams of devices in accordance with aspects of the present disclosure.

FIG. 5 shows a block diagram 500 of a device 505 that supports waveform reporting for positioning in accordance with aspects of the present disclosure. The device 505 may be an example of aspects of a UE 115 or base station 105 as described herein. The device 505 may include a receiver 510, a communications manager 515, and a transmitter 520. The device 505 may also include a processor. Each of these components may be in communication with one another (e.g., via one or more buses). In some cases, the communications manager 515 may be implemented in hardware, software, or a combination thereof, and may be implemented with a processor (e.g., a processor 840 described with reference to FIG. 8 or a processor 940 described with reference to FIG. 9), digital signal processor, or dedicated hardware.

Receiver 510 may receive information such as packets, user data, or control information associated with various information channels (e.g., control channels, data channels, and information related to waveform reporting for positioning, etc.). Information may be passed on to other components of the device 505. The receiver 510 may be an example of aspects of the transceiver 820 or 920 as described with reference to FIGS. 8 and 9. The receiver 510 may utilize a single antenna or a set of antennas.

The communications manager 515 may receive a waveform reporting request instructing the wireless device to measure a waveform, identify a set of reporting parameters for sampling the waveform, generate samples of the waveform based on the set of reporting parameters, and transmit a waveform report that is generated based on the samples. The communications manager 515 may also transmit a waveform reporting request instructing a wireless device to measure a waveform, transmit the waveform, and receive, from the wireless device, a waveform report that is generated based on a set of reporting parameters for sampling the waveform. The communications manager 515 may be an example of aspects of the communications manager 810 or 910 as described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Transmitter 520 may transmit signals generated by other components of the device 505. In some examples, the transmitter 520 may be collocated with a receiver 510 in a transceiver module. For example, the transmitter 520 may be an example of aspects of the transceiver 820 or 920 as described with reference to FIGS. 8 and 9. The transmitter 520 may utilize a single antenna or a set of antennas.

Figure 6:
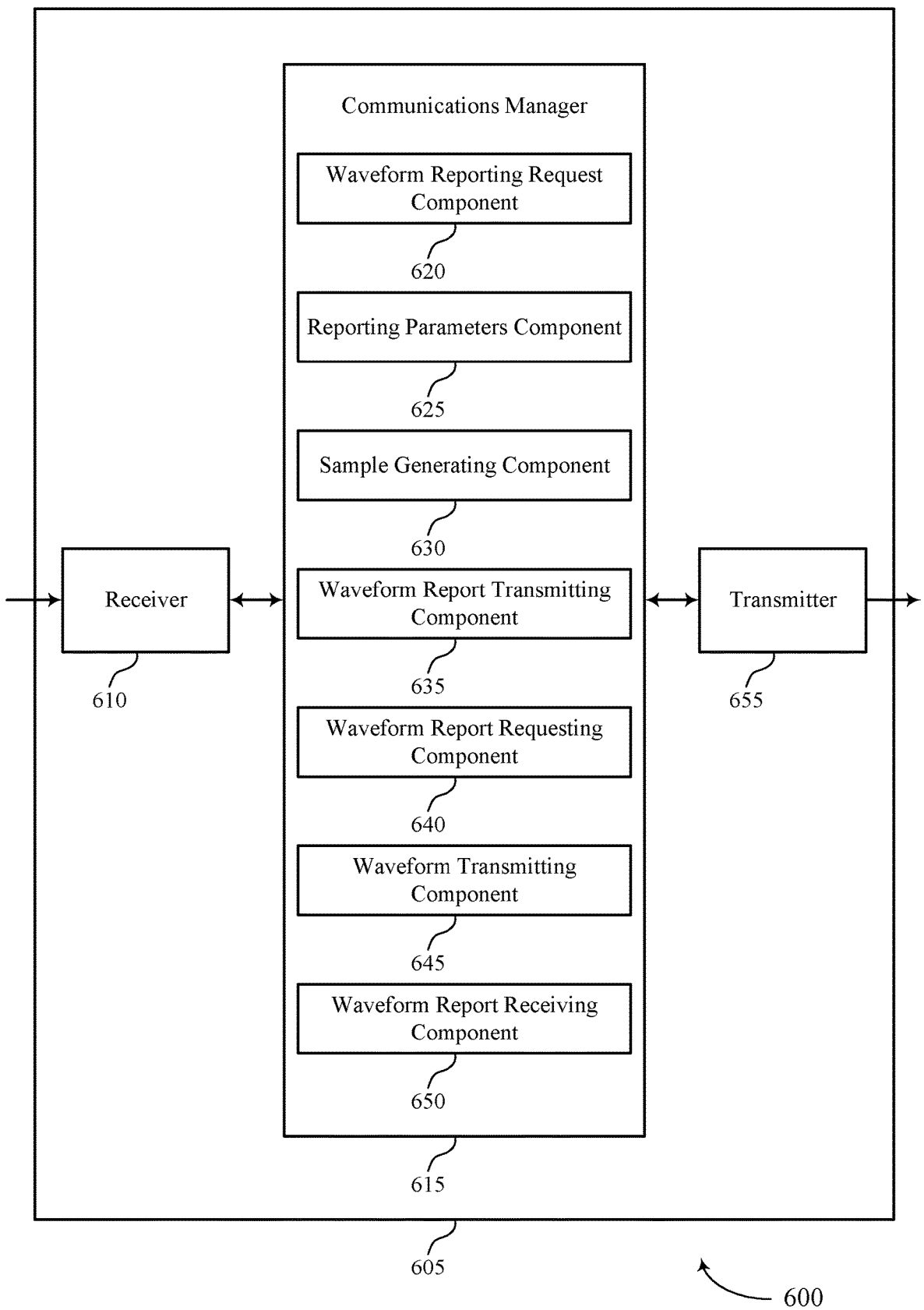

FIG. 6 shows a block diagram 600 of a device 605 that supports waveform reporting for positioning in accordance with aspects of the present disclosure. The device 605 may be an example of aspects of a device 505, a UE 115, or a base station 105 as described herein. The device 605 may include a receiver 610, a communications manager 615, and a transmitter 655. The device 605 may also include a processor. Each of these components may be in communication with one another (e.g., via one or more buses).

Receiver 610 may receive information such as packets, user data, or control information associated with various information channels (e.g., control channels, data channels, and information related to waveform reporting for positioning, etc.). Information may be passed on to other components of the device 605. The receiver 610 may be an example of aspects of the transceiver 820 or 920 as described with reference to FIGS. 8 and 9. The receiver 610 may utilize a single antenna or a set of antennas.

The communications manager 615 may be an example of aspects of the communications manager 515 as described herein. The communications manager 615 may include a waveform reporting request component 620, a reporting parameters component 625, a sample generating component 630, a waveform report transmitting component 635, a waveform report requesting component 640, a waveform transmitting component 645, and a waveform report receiving component 650. The communications manager 615 may be an example of aspects of the communications manager 810 or 910 as described herein. In some cases, the communications manager 615 may be implemented in hardware, software, or a combination thereof, and may be implemented with a processor (e.g., a processor 840 described with reference to FIG. 8 or a processor 940 described with reference to FIG. 9), digital signal processor, or dedicated hardware.

The waveform reporting request component 620 may receive a waveform reporting request instructing the wireless device to measure a waveform. The reporting parameters component 625 may identify a set of reporting parameters for sampling the waveform. The sample generating component 630 may generate samples of the waveform based on the set of reporting parameters. The waveform report transmitting component 635 may transmit a waveform report that is generated based on the samples.

The waveform report requesting component 640 may transmit a waveform reporting request instructing a wireless device to measure a waveform. The waveform transmitting component 645 may transmit the waveform. The waveform report receiving component 650 may receive, from the wireless device, a waveform report that is generated based on a set of reporting parameters for sampling the waveform.

Transmitter 655 may transmit signals generated by other components of the device 605. In some examples, the transmitter 655 may be collocated with a receiver 610 in a transceiver module. For example, the transmitter 655 may be an example of aspects of the transceiver 820 or 920 as described with reference to FIGS. 8 and 9. The transmitter 655 may utilize a single antenna or a set of antennas.

Figure 7:
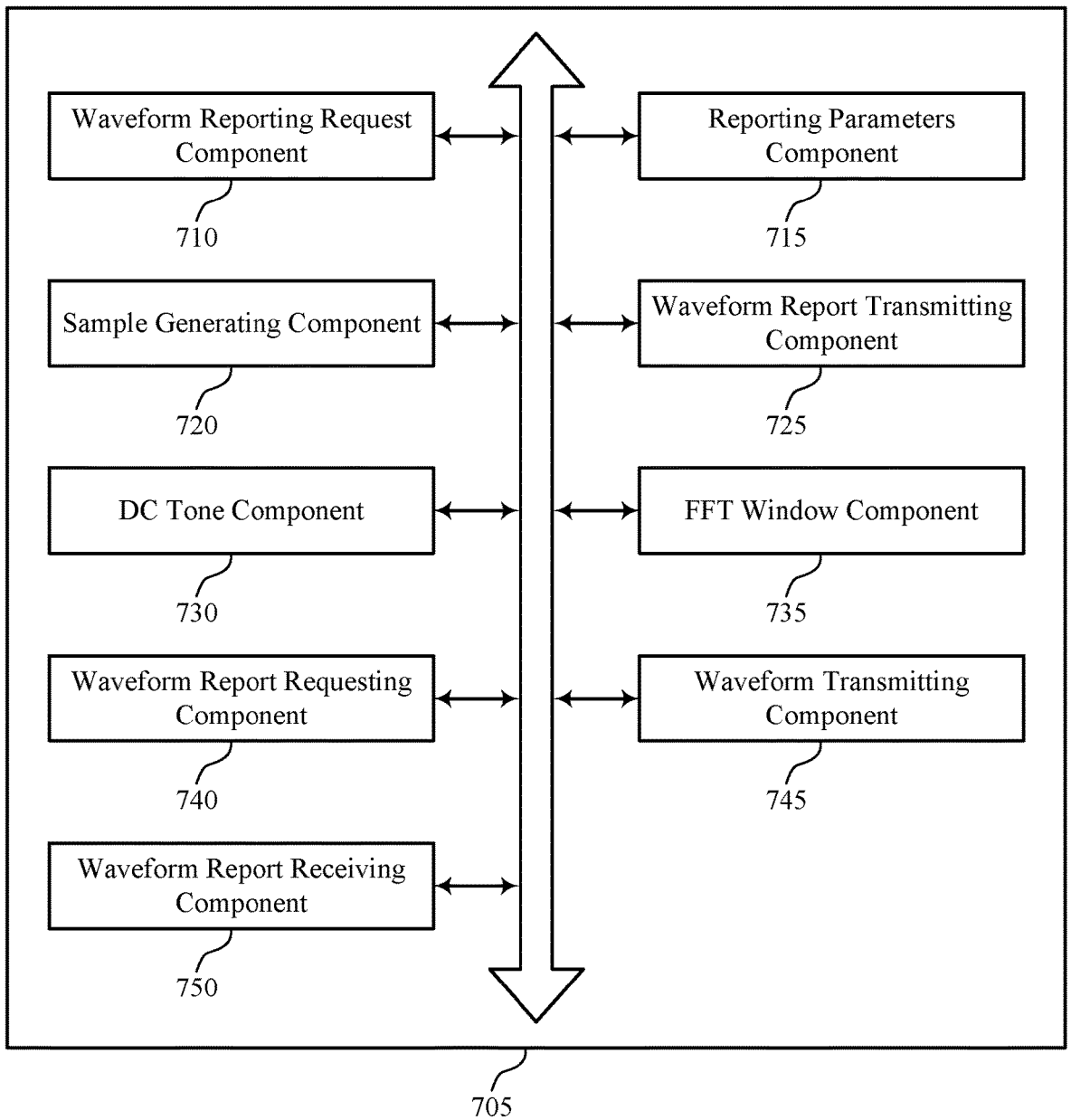
FIG. 7 shows a block diagram of a communications manager in accordance with aspects of the present disclosure.

FIG. 7 shows a block diagram 700 of a communications manager 705 that supports waveform reporting for positioning in accordance with aspects of the present disclosure. The communications manager 705 may be an example of aspects of a communications manager 515, a communications manager 615, or a communications manager 810 described herein.

The communications manager 705 may include a waveform reporting request component 710, a reporting parameters component 715, a sample generating component 720, a waveform report transmitting component 725, a DC tone component 730, a FFT window component 735, a waveform report requesting component 740, a waveform transmitting component 745, and a waveform report receiving component 750. Each of these modules may communicate, directly or indirectly, with one another (e.g., via one or more buses). In some cases, the communications manager 705 may be implemented in hardware, software, or a combination thereof, and may be implemented with a processor (e.g., a processor 840 described with reference to FIG. 8 or a processor 940 described with reference to FIG. 9), digital signal processor, or dedicated hardware.

The waveform reporting request component 710 may receive a waveform reporting request instructing the wireless device to measure a waveform. In some cases, the waveform includes a positioning reference signal. In some cases, the wireless device is a user equipment or a base station, and the waveform report is transmitted to a base station, a user equipment, or a location server.

The reporting parameters component 715 may identify a set of reporting parameters for sampling the waveform. In some examples, the reporting parameters component 715 may identify at least one receive antenna of the wireless device, at least one port, a bandwidth of the waveform, an oversampling rate, or any combination thereof. In some examples, the reporting parameters component 715 may receive control signaling indicating a first parameter in the set of reporting parameters.

In some examples, the reporting parameters component 715 may determine a second reporting parameter in the set of reporting parameters based on the first parameter. In some examples, the reporting parameters component 715 may select, by the wireless device, each reporting parameter in the set of reporting parameters.

The sample generating component 720 may generate samples of the waveform based on the set of reporting parameters. In some examples, the sample generating component 720 may generate the samples of the waveform before or after performing UE processing. In some cases, the UE processing may include a channel estimation, pilot descrambling, removing a cyclic prefix, or a combination thereof.

In some examples, the sample generating component 720 may process the samples to generate a combined received energy, where the waveform report indicates the combined received energy. In some examples, the sample generating component 720 may generate the samples of the waveform before or after performing channel estimation.

In some examples, the sample generating component 720 may generate the samples of the waveform before or after performing pilot descrambling. In some examples, the sample generating component 720 may generate the samples of the waveform before or after removing a cyclic prefix from the waveform. In some examples, the sample generating component 720 may generate the samples of the waveform on up to each symbol of a set of symbols of the waveform, on up to each tone of a set tones of the waveform, or both.

In some examples, the sample generating component 720 may generate the samples of the waveform on positioning reference signal symbols that are a subset of symbols within a set of symbols of the waveform, on positioning reference signal tones that are a subset of tones within a set tones of the waveform, or both. In some examples, the sample generating component 720 may suspend or reducing a frequency of making timing corrections for a time period corresponding to a periodic reporting of the samples of the waveform.

In some examples, the sample generating component 720 may correct timing prior for a time period corresponding to generating the samples of the waveform, where the waveform report indicates a timing adjustment for at least one sample of the samples of the waveform. In some examples, the sample generating component 720 may suspend a debugging log or channel state information reporting for at least a time period corresponding to generating the samples of the waveform.

In some cases, the waveform report indicates whether the samples are generated before or after performing channel estimation. In some cases, the waveform report indicates whether the samples are generated before or after performing pilot descrambling. In some cases, the waveform report indicates whether the samples are generated before or after removing the cyclic prefix. In some cases, the samples are time domain samples, frequency domain samples, or both.

The waveform report transmitting component 725 may transmit a waveform report that is generated based on the samples. In some cases, the waveform report indicates at least one reporting parameter of the set of reporting parameters. In some cases, the at least one reporting parameter is a bitwidth of the samples, a total number of the samples, a number and identity of one or more base stations, a number and identity of one or more transmit points, or a combination thereof. In some cases, the waveform report includes the samples of the waveform, information generated by processing the samples of the waveform, or both. In some cases, the waveform report indicates whether the samples are generated using a staggered comb or a de-staggered comb. In some cases, the report indicates a bitwidth of the samples. In some cases, the report indicates a total number of the samples. In some cases, the waveform report indicates a timing control configuration of the samples. In some cases, the waveform report indicates a number and identity of one or more base stations, transmit points, or both, reported in the waveform report.

The waveform report requesting component 740 may transmit a waveform reporting request instructing a wireless device to measure a waveform. In some cases, the waveform includes a positioning reference signal. In some cases, the waveform reporting request indicates a first parameter of the set of reporting parameters, and the waveform report indicates at least one parameter of the set of parameters derived from the first parameter.

The waveform transmitting component 745 may transmit the waveform. The waveform report receiving component 750 may receive, from the wireless device, a waveform report that is generated based on a set of reporting parameters for sampling the waveform. In some examples, the waveform report receiving component 750 may determine a location of the wireless device based on the waveform report. In some examples, the waveform report receiving component 750 may process samples of the waveform included in the report based on a DC tone indicated by the waveform report.

In some examples, the waveform report receiving component 750 may identify at least one receive antenna, at least one port, a bandwidth of the waveform, an oversampling rate, or any combination thereof, indicated in the waveform report. In some examples, the waveform report receiving component 750 may generate a debugging log or channel state information based on the waveform report. In some cases, the waveform report indicates at least one reporting parameter of the set of reporting parameters for sampling of the waveform. In some cases, the samples are time domain samples, frequency domain samples, or both. In some cases, the waveform report includes the samples, information generated by processing the samples of the waveform, or both.

The DC tone component 730 may select a location of a DC tone of the wireless device. In some examples, the DC tone component 730 may generate the samples of the waveform based on the selected location of the DC tone. In some cases, the waveform report indicates a tone index or a tone frequency of the DC tone. In some cases, the tone index or the tone frequency of the DC tone may be with respect to a reference point.

The FFT window component 735 may determine that a second waveform does not arrive within a cyclic prefix of the waveform corresponding to a first fast Fourier transform window for generating the samples of the waveform. In some examples, the FFT window component 735 may generate second samples of the second waveform using a second fast fourier transform window that is offset from the first fast Fourier transform window, where the waveform report is generated based on the second samples.

Figure 8:
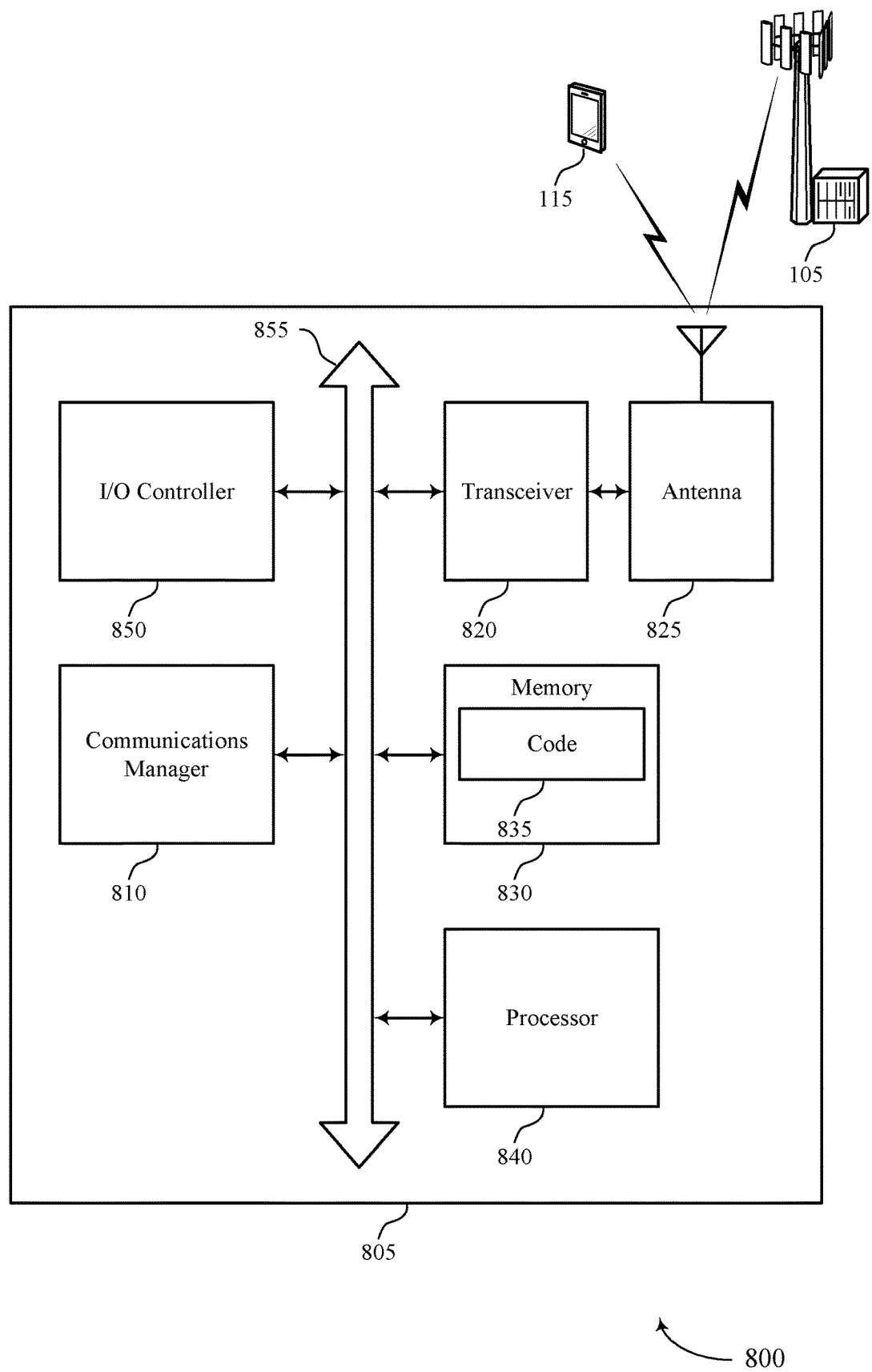
FIG. 8 shows a diagram of a system including a user equipment (UE) in accordance with aspects of the present disclosure.

FIG. 8 shows a diagram of a system 800 including a device 805 that supports waveform reporting for positioning in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, a transceiver 820, an antenna 825, memory 830, a processor 840, and an I/O controller 850. These components may be in electronic communication via one or more buses (e.g., bus 855).

The communications manager 810 may receive a waveform reporting request instructing the wireless device to measure a waveform, identify a set of reporting parameters for sampling the waveform, generate samples of the waveform based on the set of reporting parameters, and transmit a waveform report that is generated based on the samples. The communications manager 810 may also transmit a waveform reporting request instructing a wireless device to measure a waveform, transmit the waveform, and receive, from the wireless device, a waveform report that is generated based on a set of reporting parameters for sampling the waveform. In some cases, the communications manager 810 may be implemented in dedicated hardware, software, or a combination thereof, and may be implemented with a processor, digital signal processor, or dedicated hardware.

Transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM, ROM, or a combination thereof. The memory 830 may store computer-readable code 835 including instructions that, when executed by a processor (e.g., the processor 840) cause the device to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting waveform reporting for positioning).

The I/O controller 850 may manage input and output signals for the device 805. The I/O controller 850 may also manage peripherals not integrated into the device 805. In some cases, the I/O controller 850 may represent a physical connection or port to an external peripheral. In some cases, the I/O controller 850 may utilize an operating system such as iOS®, ANDROID®, MS-DOS®, MS-WINDOWS®, OS/2®, UNIX®, LINUX®, or another known operating system. In other cases, the I/O controller 850 may represent or interact with a modem, a keyboard, a mouse, a touchscreen, or a similar device. In some cases, the I/O controller 850 may be implemented as part of a processor. In some cases, a user may interact with the device 805 via the I/O controller 850 or via hardware components controlled by the I/O controller 850.

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
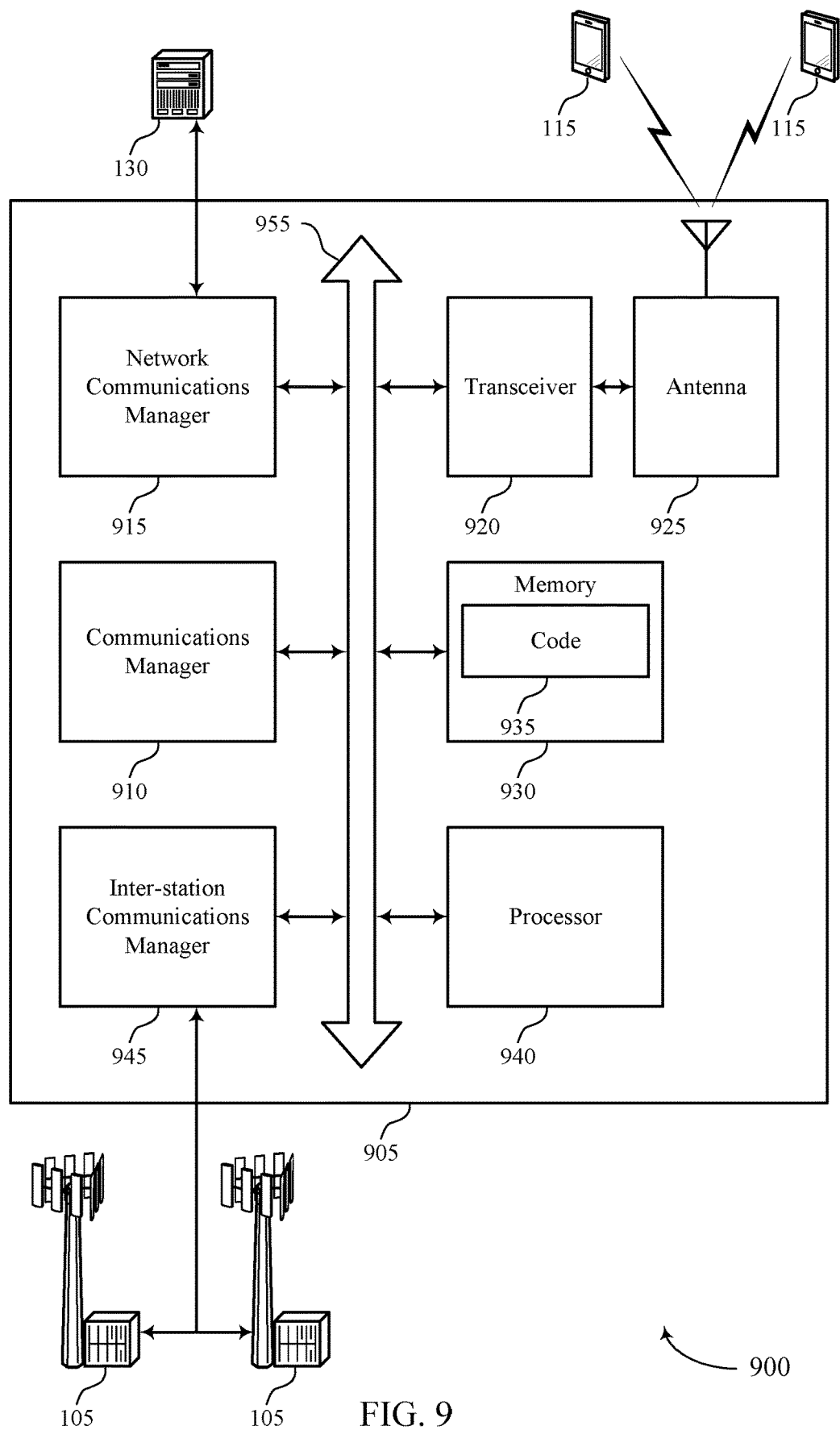
FIG. 9 shows a diagram of a system including a base station in accordance with aspects of the present disclosure.

FIG. 9 shows a diagram of a system 900 including a device 905 that supports waveform reporting for positioning in accordance with aspects of the present disclosure. The device 905 may be an example of or include the components of device 505, device 605, or a base station 105 as described herein. The device 905 may include components for bi-directional voice and data communications including components for transmitting and receiving communications, including a communications manager 910, a network communications manager 915, a transceiver 920, an antenna 925, memory 930, a processor 940, and an inter-station communications manager 945. These components may be in electronic communication via one or more buses (e.g., bus 955).

The communications manager 910 may receive a waveform reporting request instructing the wireless device to measure a waveform, identify a set of reporting parameters for sampling the waveform, generate samples of the waveform based on the set of reporting parameters, and transmit a waveform report that is generated based on the samples. The communications manager 910 may also transmit a waveform reporting request instructing a wireless device to measure a waveform, transmit the waveform, and receive, from the wireless device, a waveform report that is generated based on a set of reporting parameters for sampling the waveform. In some cases, the communications manager 910 may be implemented in dedicated hardware, software, or a combination thereof, and may be implemented with a processor, digital signal processor, or dedicated hardware.

Network communications manager 915 may manage communications with the core network (e.g., via one or more wired backhaul links). For example, the network communications manager 915 may manage the transfer of data communications for client devices, such as one or more UEs 115.

Transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM, ROM, or a combination thereof. The memory 930 may store computer-readable code 935 including instructions that, when executed by a processor (e.g., the processor 940) cause the device to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting waveform reporting for positioning).

Inter-station communications manager 945 may manage communications with other base station 105 and may include a controller or scheduler for controlling communications with UEs 115 in cooperation with other base stations 105. For example, the inter-station communications manager 945 may coordinate scheduling for transmissions to UEs 115 for various interference mitigation techniques such as beamforming or joint transmission. In some examples, inter-station communications manager 945 may provide an X2 interface within an LTE/LTE-A wireless communication network technology to provide communication between base stations 105.

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
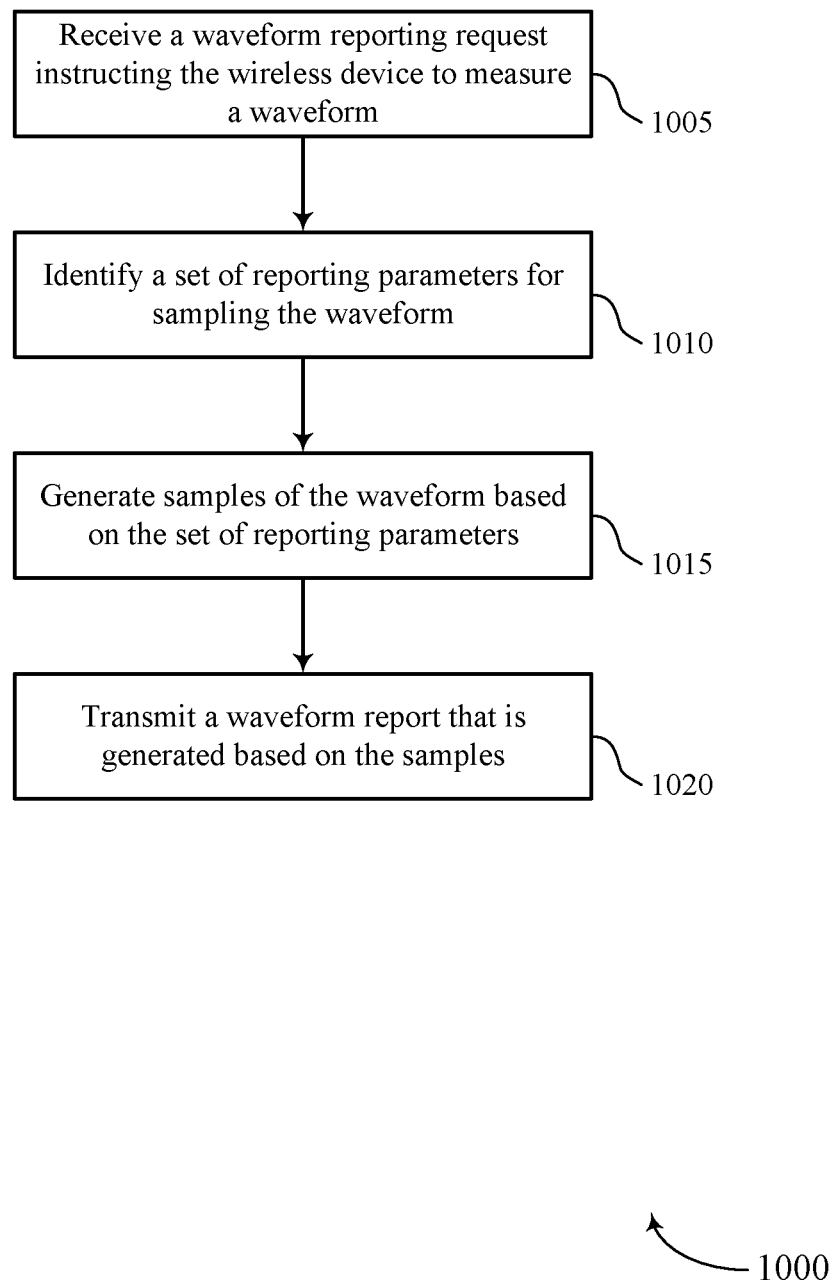
FIGS. 10 through 15 show flowcharts illustrating methods in accordance with aspects of the present disclosure.

FIG. 10 shows a flowchart illustrating a method 1000 that supports waveform reporting for positioning in accordance with aspects of the present disclosure. The operations of method 1000 may be implemented by a UE 115 or base station 105 or its components as described herein. For example, the operations of method 1000 may be performed by a communications manager as described with reference to FIGS. 5 through 9. In some examples, a UE or base station may execute a set of instructions to control the functional elements of the UE or base station to perform the functions described below. Additionally or alternatively, a UE or base station may perform aspects of the functions described below using special-purpose hardware.

At 1005, the UE or base station may receive a waveform reporting request instructing the wireless device to measure a waveform. The operations of 1005 may be performed according to the methods described herein. In some examples, aspects of the operations of 1005 may be performed by a waveform reporting request component as described with reference to FIGS. 5 through 9. Additionally, or alternatively, means for performing 1005 may, but not necessarily, include, for example, antenna 825, transceiver 820, communications manager 810, memory 830 (including code 835), processor 840 and/or bus 845, for example in a UE 115. Additionally, or alternatively, means for performing 1005 may, but not necessarily, include, for example, antenna 925, transceiver 920, communications manager 910, memory 930 (including code 935), processor 940, inter-station communications manager 945, and/or bus 955, for example in a base station 105.

At 1010, the UE or base station may identify a set of reporting parameters for sampling the waveform. The operations of 1010 may be performed according to the methods described herein. In some examples, aspects of the operations of 1010 may be performed by a reporting parameters component as described with reference to FIGS. 5 through 9. Additionally, or alternatively, means for performing 1010 may, but not necessarily, include, for example, antenna 825, transceiver 820, communications manager 810, memory 830 (including code 835), processor 840 and/or bus 845, for example in a UE 115. Additionally, or alternatively, means for performing 1010 may, but not necessarily, include, for example, antenna 925, transceiver 920, communications manager 910, memory 930 (including code 935), processor 940, inter-station communications manager 945, and/or bus 955, for example in a base station 105.

At 1015, the UE or base station may generate samples of the waveform based on the set of reporting parameters. The operations of 1015 may be performed according to the methods described herein. In some examples, aspects of the operations of 1015 may be performed by a sample generating component as described with reference to FIGS. 5 through 9. Additionally, or alternatively, means for performing 1015 may, but not necessarily, include, for example, antenna 825, transceiver 820, communications manager 810, memory 830 (including code 835), processor 840 and/or bus 845, for example in a UE 115. Additionally, or alternatively, means for performing 1015 may, but not necessarily, include, for example, antenna 925, transceiver 920, communications manager 910, memory 930 (including code 935), processor 940, inter-station communications manager 945, and/or bus 955, for example in a base station 105.

At 1020, the UE or base station may transmit a waveform report that is generated based on the samples. The operations of 1020 may be performed according to the methods described herein. In some examples, aspects of the operations of 1020 may be performed by a waveform report transmitting component as described with reference to FIGS. 5 through 9. Additionally, or alternatively, means for performing 1020 may, but not necessarily, include, for example, antenna 825, transceiver 820, communications manager 810, memory 830 (including code 835), processor 840 and/or bus 845, for example in a UE 115. Additionally, or alternatively, means for performing 1020 may, but not necessarily, include, for example, antenna 925, transceiver 920, communications manager 910, memory 930 (including code 935), processor 940, inter-station communications manager 945, and/or bus 955, for example in a base station 105.

Figure 11:
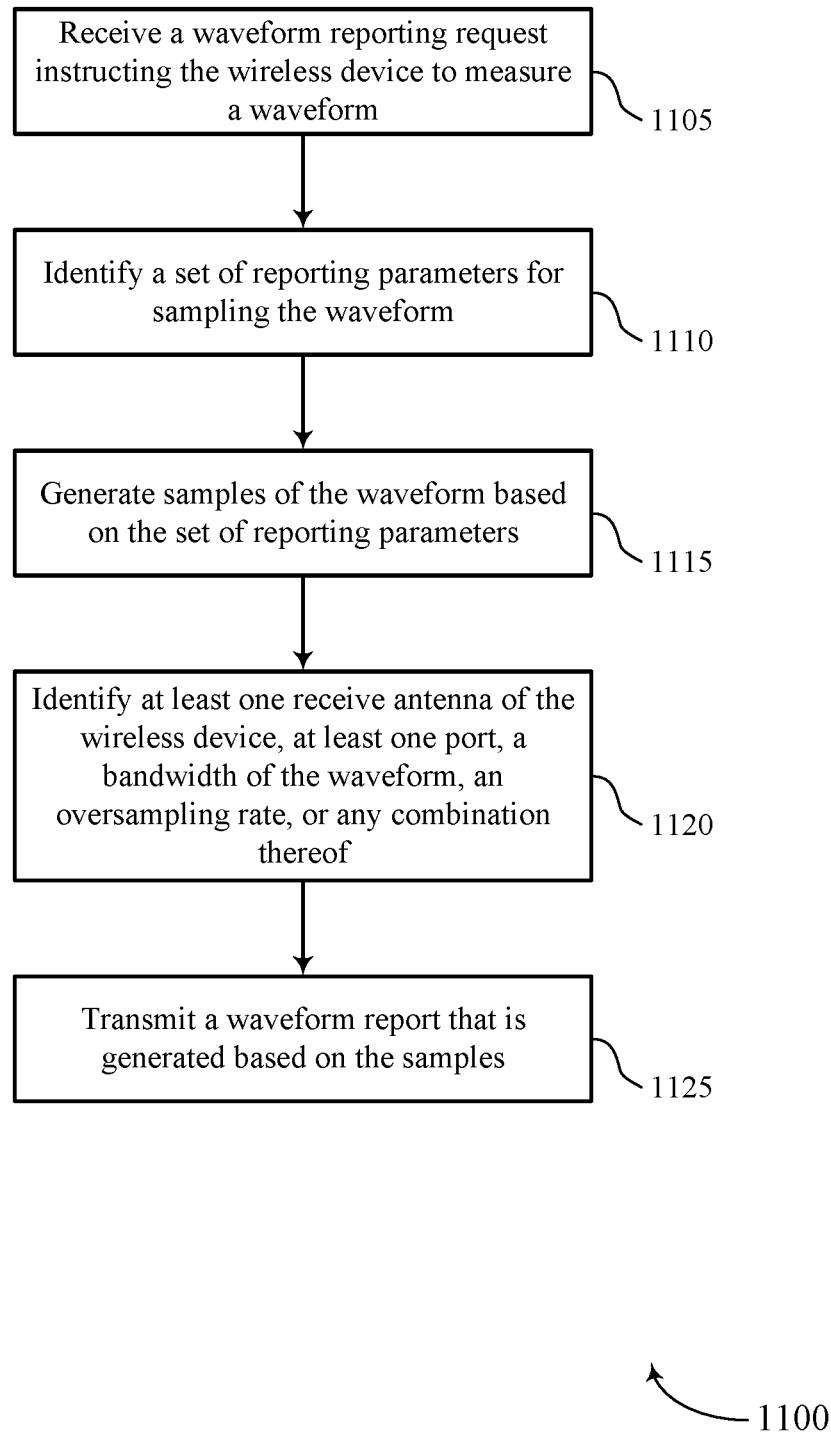

FIG. 11 shows a flowchart illustrating a method 1100 that supports waveform reporting for positioning in accordance with aspects of the present disclosure. The operations of method 1100 may be implemented by a UE 115 or base station 105 or its components as described herein. For example, the operations of method 1100 may be performed by a communications manager as described with reference to FIGS. 5 through 9. In some examples, a UE or base station may execute a set of instructions to control the functional elements of the UE or base station to perform the functions described below. Additionally or alternatively, a UE or base station may perform aspects of the functions described below using special-purpose hardware.

At 1105, the UE or base station may receive a waveform reporting request instructing the wireless device to measure a waveform. The operations of 1105 may be performed according to the methods described herein. In some examples, aspects of the operations of 1105 may be performed by a waveform reporting request component as described with reference to FIGS. 5 through 9.

At 1110, the UE or base station may identify a set of reporting parameters for sampling the waveform. The operations of 1110 may be performed according to the methods described herein. In some examples, aspects of the operations of 1110 may be performed by a reporting parameters component as described with reference to FIGS. 5 through 9.

At 1115, the UE or base station may generate samples of the waveform based on the set of reporting parameters. The operations of 1115 may be performed according to the methods described herein. In some examples, aspects of the operations of 1115 may be performed by a sample generating component as described with reference to FIGS. 5 through 9.

At 1120, the UE or base station may identify at least one receive antenna of the wireless device, at least one port, a bandwidth of the waveform, an oversampling rate, or any combination thereof. The operations of 1120 may be performed according to the methods described herein. In some examples, aspects of the operations of 1120 may be performed by a reporting parameters component as described with reference to FIGS. 5 through 9.

At 1125, the UE or base station may transmit a waveform report that is generated based on the samples. The operations of 1125 may be performed according to the methods described herein. In some examples, aspects of the operations of 1125 may be performed by a waveform report transmitting component as described with reference to FIGS. 5 through 9.

Figure 12:
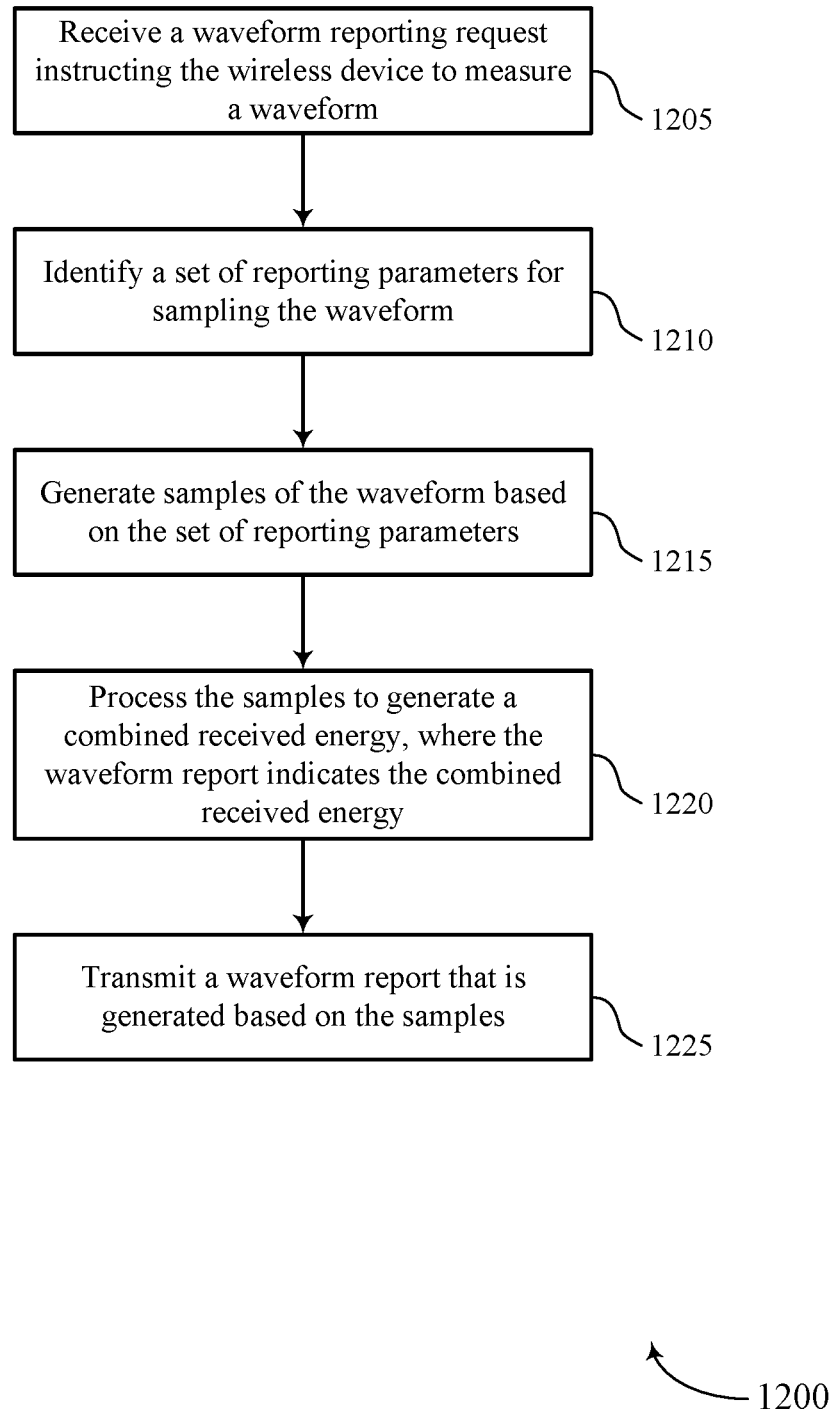

FIG. 12 shows a flowchart illustrating a method 1200 that supports waveform reporting for positioning in accordance with aspects of the present disclosure. The operations of method 1200 may be implemented by a UE 115 or base station 105 or its components as described herein. For example, the operations of method 1200 may be performed by a communications manager as described with reference to FIGS. 5 through 9. In some examples, a UE or base station may execute a set of instructions to control the functional elements of the UE or base station to perform the functions described below. Additionally or alternatively, a UE or base station may perform aspects of the functions described below using special-purpose hardware.

At 1205, the UE or base station may receive a waveform reporting request instructing the wireless device to measure a waveform. The operations of 1205 may be performed according to the methods described herein. In some examples, aspects of the operations of 1205 may be performed by a waveform reporting request component as described with reference to FIGS. 5 through 9.

At 1210, the UE or base station may identify a set of reporting parameters for sampling the waveform. The operations of 1210 may be performed according to the methods described herein. In some examples, aspects of the operations of 1210 may be performed by a reporting parameters component as described with reference to FIGS. 5 through 9.

At 1215, the UE or base station may generate samples of the waveform based on the set of reporting parameters. The operations of 1215 may be performed according to the methods described herein. In some examples, aspects of the operations of 1215 may be performed by a sample generating component as described with reference to FIGS. 5 through 9.

At 1220, the UE or base station may process the samples to generate a combined received energy, where the waveform report indicates the combined received energy. The operations of 1220 may be performed according to the methods described herein. In some examples, aspects of the operations of 1220 may be performed by a sample generating component as described with reference to FIGS. 5 through 9.

At 1225, the UE or base station may transmit a waveform report that is generated based on the samples. The operations of 1225 may be performed according to the methods described herein. In some examples, aspects of the operations of 1225 may be performed by a waveform report transmitting component as described with reference to FIGS. 5 through 9.

Figure 13:
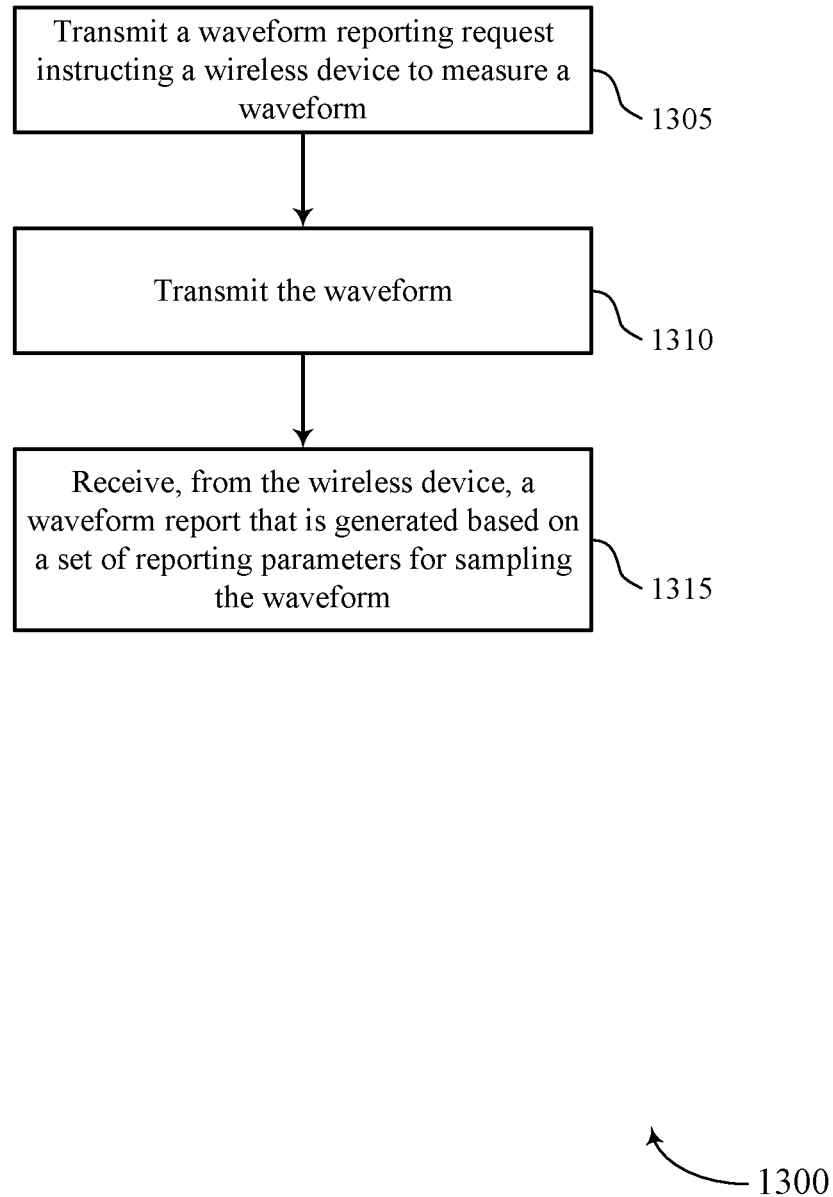

FIG. 13 shows a flowchart illustrating a method 1300 that supports waveform reporting for positioning in accordance with aspects of the present disclosure. The operations of method 1300 may be implemented by a UE 115 or base station 105 or its components as described herein. For example, the operations of method 1300 may be performed by a communications manager as described with reference to FIGS. 5 through 9. In some examples, a UE or base station may execute a set of instructions to control the functional elements of the UE or base station to perform the functions described below. Additionally or alternatively, a UE or base station may perform aspects of the functions described below using special-purpose hardware.

At 1305, the UE or base station may transmit a waveform reporting request instructing a wireless device to measure a waveform. The operations of 1305 may be performed according to the methods described herein. In some examples, aspects of the operations of 1305 may be performed by a waveform report requesting component as described with reference to FIGS. 5 through 9. Additionally, or alternatively, means for performing 1305 may, but not necessarily, include, for example, antenna 825, transceiver 820, communications manager 810, memory 830 (including code 835), processor 840 and/or bus 845. Additionally, or alternatively, means for performing 1305 may, but not necessarily, include, for example, antenna 925, transceiver 920, communications manager 910, memory 930 (including code 935), processor 940, inter-station communications manager 945, and/or bus 955.

At 1310, the UE or base station may transmit the waveform. The operations of 1310 may be performed according to the methods described herein. In some examples, aspects of the operations of 1310 may be performed by a waveform transmitting component as described with reference to FIGS. 5 through 9. Additionally, or alternatively, means for performing 1310 may, but not necessarily, include, for example, antenna 825, transceiver 820, communications manager 810, memory 830 (including code 835), processor 840 and/or bus 845. Additionally, or alternatively, means for performing 1310 may, but not necessarily, include, for example, antenna 925, transceiver 920, communications manager 910, memory 930 (including code 935), processor 940, inter-station communications manager 945, and/or bus 955.

At 1315, the UE or base station may receive, from the wireless device, a waveform report that is generated based on a set of reporting parameters for sampling the waveform. The operations of 1315 may be performed according to the methods described herein. In some examples, aspects of the operations of 1315 may be performed by a waveform report receiving component as described with reference to FIGS. 5 through 9. Additionally, or alternatively, means for performing 1315 may, but not necessarily, include, for example, antenna 825, transceiver 820, communications manager 810, memory 830 (including code 835), processor 840 and/or bus 845. Additionally, or alternatively, means for performing 1315 may, but not necessarily, include, for example, antenna 925, transceiver 920, communications manager 910, memory 930 (including code 935), processor 940, inter-station communications manager 945, and/or bus 955.

Figure 14:
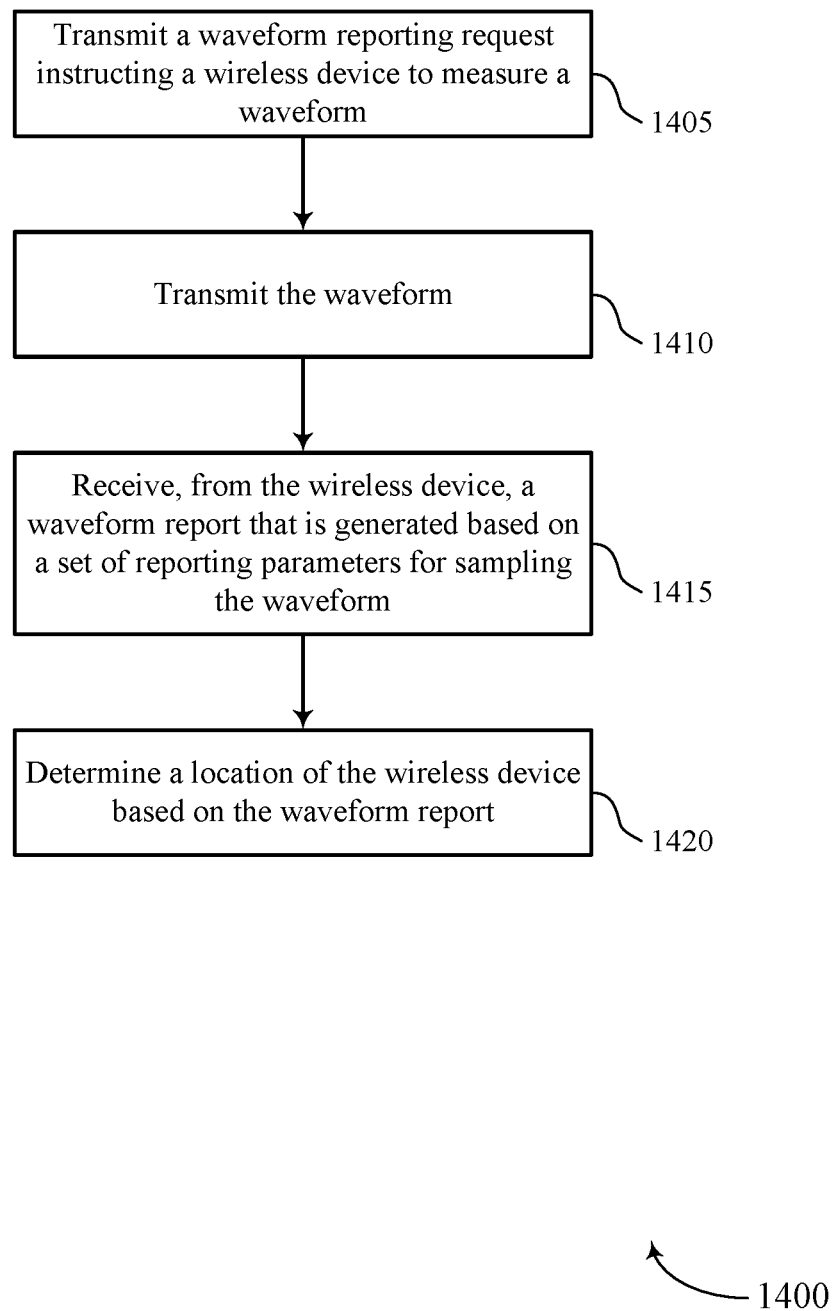

FIG. 14 shows a flowchart illustrating a method 1400 that supports waveform reporting for positioning in accordance with aspects of the present disclosure. The operations of method 1400 may be implemented by a UE 115 or base station 105 or its components as described herein. For example, the operations of method 1400 may be performed by a communications manager as described with reference to FIGS. 5 through 9. In some examples, a UE or base station may execute a set of instructions to control the functional elements of the UE or base station to perform the functions described below. Additionally or alternatively, a UE or base station may perform aspects of the functions described below using special-purpose hardware.

At 1405, the UE or base station may transmit a waveform reporting request instructing a wireless device to measure a waveform. The operations of 1405 may be performed according to the methods described herein. In some examples, aspects of the operations of 1405 may be performed by a waveform report requesting component as described with reference to FIGS. 5 through 9.

At 1410, the UE or base station may transmit the waveform. The operations of 1410 may be performed according to the methods described herein. In some examples, aspects of the operations of 1410 may be performed by a waveform transmitting component as described with reference to FIGS. 5 through 9.

At 1415, the UE or base station may receive, from the wireless device, a waveform report that is generated based on a set of reporting parameters for sampling the waveform. The operations of 1415 may be performed according to the methods described herein. In some examples, aspects of the operations of 1415 may be performed by a waveform report receiving component as described with reference to FIGS. 5 through 9.

At 1420, the UE or base station may determine a location of the wireless device based on the waveform report. The operations of 1420 may be performed according to the methods described herein. In some examples, aspects of the operations of 1420 may be performed by a waveform report receiving component as described with reference to FIGS. 5 through 9.

Figure 15:
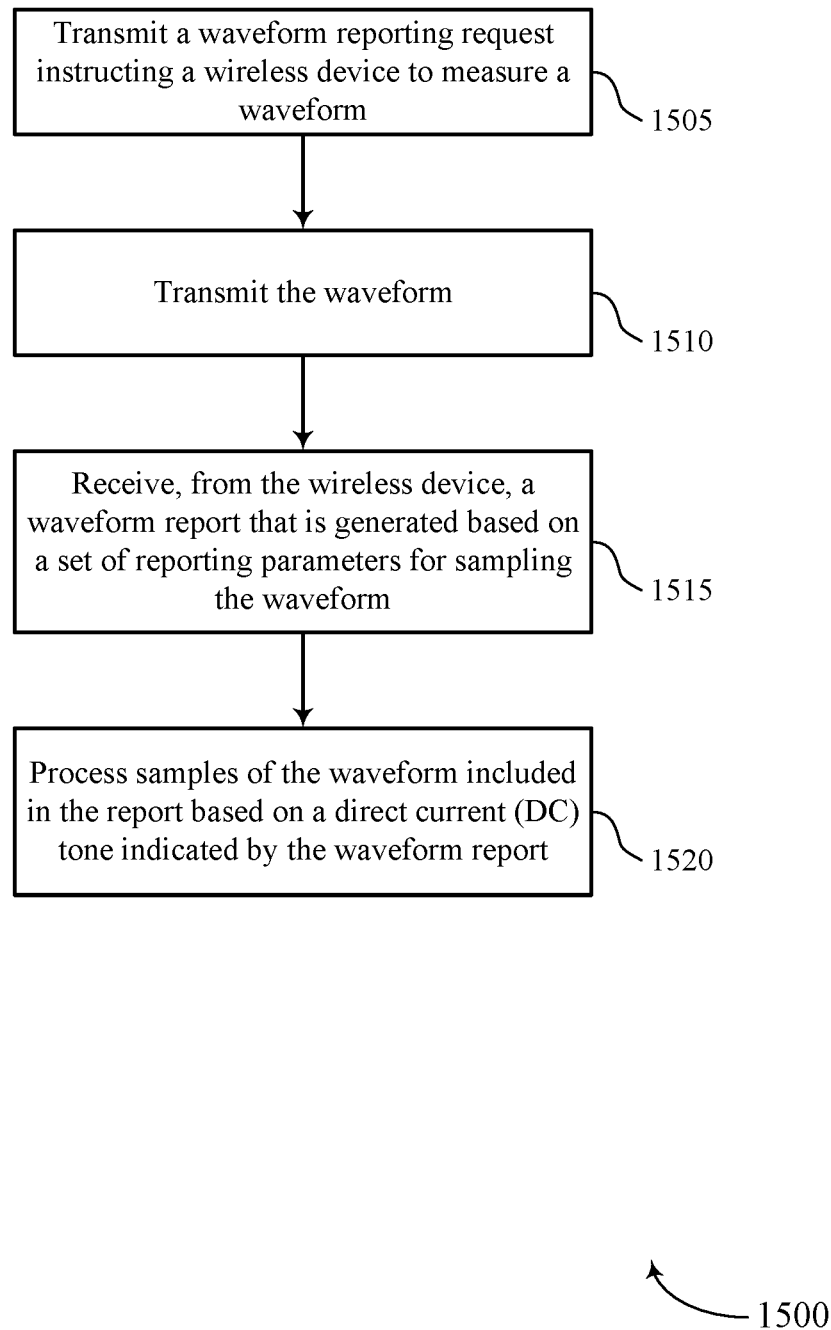

FIG. 15 shows a flowchart illustrating a method 1500 that supports waveform reporting for positioning in accordance with aspects of the present disclosure. The operations of method 1500 may be implemented by a UE 115 or base station 105 or its components as described herein. For example, the operations of method 1500 may be performed by a communications manager as described with reference to FIGS. 5 through 9. In some examples, a UE or base station may execute a set of instructions to control the functional elements of the UE or base station to perform the functions described below. Additionally or alternatively, a UE or base station may perform aspects of the functions described below using special-purpose hardware.

At 1505, the UE or base station may transmit a waveform reporting request instructing a wireless device to measure a waveform. The operations of 1505 may be performed according to the methods described herein. In some examples, aspects of the operations of 1505 may be performed by a waveform report requesting component as described with reference to FIGS. 5 through 9.

At 1510, the UE or base station may transmit the waveform. The operations of 1510 may be performed according to the methods described herein. In some examples, aspects of the operations of 1510 may be performed by a waveform transmitting component as described with reference to FIGS. 5 through 9.

At 1515, the UE or base station may receive, from the wireless device, a waveform report that is generated based on a set of reporting parameters for sampling the waveform. The operations of 1515 may be performed according to the methods described herein. In some examples, aspects of the operations of 1515 may be performed by a waveform report receiving component as described with reference to FIGS. 5 through 9.

At 1520, the UE or base station may process samples of the waveform included in the report based on a direct current (DC) tone indicated by the waveform report. The operations of 1520 may be performed according to the methods described herein. In some examples, aspects of the operations of 1520 may be performed by a waveform report receiving component as described with reference to FIGS. 5 through 9.

It should be noted that the methods described herein describe possible implementations, and that the operations and the steps may be rearranged or otherwise modified and that other implementations are possible. Further, aspects from two or more of the methods may be combined.

Example 1: A method for wireless communications by a wireless device, comprising: receiving a waveform reporting request instructing the wireless device to measure a waveform; identifying a set of reporting parameters for sampling the waveform; generating samples of the waveform based at least in part on the set of reporting parameters; and transmitting a waveform report that is generated based at least in part on the samples.

Example 2: The method of example 1, wherein identifying the set of reporting parameters comprises: identifying at least one receive antenna of the wireless device, at least one port, a bandwidth of the waveform, an oversampling rate, or any combination thereof.

Example 3: The method of examples 1 or 2, further comprising: processing the samples to generate a combined received energy, wherein the waveform report indicates the combined received energy.

Example 4: The method of any of examples 1 to 3, wherein generating the samples of the waveform comprises: generating the samples of the waveform before or after performing channel estimation.

Example 5: The method of example 4, wherein the waveform report indicates whether the samples are generated before or after performing channel estimation.

Example 6: The method of any of examples 1 to 5, wherein generating the samples of the waveform comprises: generating the samples of the waveform before or after performing pilot descrambling.

Example 7: The method of example 6, wherein the waveform report indicates whether the samples are generated before or after performing pilot descrambling.

Example 8: The method of any of examples 1 to 7, wherein generating the samples of the waveform comprises: generating the samples of the waveform before or after removing a cyclic prefix from the waveform.

Example 9: The method of any of example 8, wherein the waveform report indicates whether the samples are generated before or after removing the cyclic prefix.

Example 10: The method of any of examples 1 to 9, wherein the waveform includes a positioning reference signal.

Example 11: The method of any of examples 1 to 10, wherein the waveform report indicates at least one reporting parameter of the set of reporting parameters.

Example 12: The method of any of examples 1 to 11, wherein the samples are time domain samples, frequency domain samples, or both.

Example 13: The method of any of examples 1 to 12, wherein the waveform report comprises the samples of the waveform, information generated by processing the samples of the waveform, or both.

Example 14: The method of any of examples 1 to 13, wherein the waveform report indicates whether the samples are generated using a staggered comb or a de-staggered comb.

Example 15: The method of any of examples 1 to 14, wherein generating the samples of the waveform comprises: generating the samples of the waveform on up to each symbol of a set of symbols of the waveform, on up to each tone of a set tones of the waveform, or both.

Example 16: The method of any of examples 1 to 15, wherein generating the samples of the waveform comprises: generating the samples of the waveform on positioning reference signal symbols that are a subset of symbols within a set of symbols of the waveform, on positioning reference signal tones that are a subset of tones within a set tones of the waveform, or both.

Example 17: The method of any of examples 1 to 16, wherein the report indicates a bitwidth of the samples.

Example 18: The method of any of examples 1 to 17, wherein the report indicates a total number of the samples.

Example 19: The method of any of examples 1 to 18, wherein identifying the set of reporting parameters comprises: receiving control signaling indicating a first parameter in the set of reporting parameters.

Example 20: The method of any of examples 1 to 20, wherein identifying the set of reporting parameters comprises: determining a second reporting parameter in the set of reporting parameters based at least in part on the first parameter.

Example 21: The method of any of examples 1 to 20, wherein identifying the set of reporting parameters comprises: selecting, by the wireless device, each reporting parameter in the set of reporting parameters.

Example 22: The method of any of examples 1 to 21, wherein generating the samples of the waveform comprises: selecting a location of a direct current (DC) tone of the wireless device; and generating the samples of the waveform based at least in part on the selected location of the DC tone.

Example 23: The method of any of example 22, wherein the waveform report indicates a tone index or a tone frequency of the DC tone.

Example 24: The method of any of examples 1 to 23, further comprising: determining that a second waveform does not arrive within a cyclic prefix of the waveform corresponding to a first fast Fourier transform window for generating the samples of the waveform; and generating second samples of the second waveform using a second fast fourier transform window that is offset from the first fast Fourier transform window, wherein the waveform report is generated based at least in part on the second samples.

Example 25: The method of any of examples 1 to 24, wherein generating the samples of the waveform comprises: suspending or reducing a frequency of making timing corrections for a time period corresponding to a periodic reporting of the samples of the waveform.

Example 26: The method of any of examples 1 to 25, wherein generating the samples of the waveform comprises: correcting timing prior for a time period corresponding to generating the samples of the waveform, wherein the waveform report indicates a timing adjustment for at least one sample of the samples of the waveform.

Example 27: The method of any of examples 1 to 26, further comprising: suspending a debugging log or channel state information reporting for at least a time period corresponding to generating the samples of the waveform.

Example 28: The method of any of examples 1 to 27, wherein the wireless device is a user equipment or a base station, and the waveform report is transmitted to a base station, a user equipment, or a location server.

Example 29: The method of any of examples 1 to 28, wherein the waveform report indicates a timing control configuration of the samples.

Example 30: The method of any of examples 1 to 29, wherein the waveform report indicates a number and identity of one or more base stations, transmit points, or both, reported in the waveform report.

Example 31: A method for wireless communications, comprising: transmitting a waveform reporting request instructing a wireless device to measure a waveform; transmitting the waveform; and receiving, from the wireless device, a waveform report that is generated based at least in part on a set of reporting parameters for sampling the waveform.

Example 32: The method of example 31, wherein the waveform includes a positioning reference signal.

Example 33: The method of examples 31 or 32, wherein the waveform report indicates at least one reporting parameter of the set of reporting parameters for sampling of the waveform.

Example 34: The method of any of examples 31 to 33, further comprising: determining a location of the wireless device based at least in part on the waveform report.

Example 35: The method of any of examples 31 to 34, further comprising: processing samples of the waveform included in the report based at least in part on a direct current (DC) tone indicated by the waveform report.

Example 36: The method of any of example 35, wherein the samples are time domain samples, frequency domain samples, or both.

Example 37: The method of any of examples 31 to 36, wherein the waveform report comprises the samples, information generated by processing the samples of the waveform, or both.

Example 38: The method of any of examples 31 to 37, further comprising: identifying at least one receive antenna, at least one port, a bandwidth of the waveform, an oversampling rate, or any combination thereof, indicated in the waveform report.

Example 39: The method of any of examples 31 to 38, wherein the waveform reporting request indicates a first parameter of the set of reporting parameters, and the waveform report indicates at least one parameter of the set of parameters derived from the first parameter.

Example 40: The method of any of examples 31 to 39, further comprising: generating a debugging log or channel state information based at least in part on the waveform report.

Example 41: An apparatus comprising at least one means for performing a method of any of examples 1 to 30.

Example 42: An apparatus for wireless communications comprising a processor; memory in electronic communication with the processor; and instructions stored in the memory and executable by the processor to cause the apparatus to perform a method of any of examples 1 to 30.

Example 43: A non-transitory computer-readable medium storing code for wireless communications, the code comprising instructions executable by a processor to perform a method of any of examples 1 to 30.

Example 44: An apparatus comprising at least one means for performing a method of any of examples 31 to 40.

Example 45: An apparatus for wireless communications comprising a processor; memory in electronic communication with the processor; and instructions stored in the memory and executable by the processor to cause the apparatus to perform a method of any of examples 31 to 40.

Example 46: A non-transitory computer-readable medium storing code for wireless communications, the code comprising instructions executable by a processor to perform a method of any of examples 31 to 40.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special-purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications by a wireless device, comprising:
    receiving a waveform reporting request instructing the wireless device to measure a waveform;
    identifying a set of reporting parameters for sampling the waveform;
    generating samples of the waveform based at least in part on the set of reporting parameters, wherein the samples are time domain samples, frequency domain samples, or both; and
    transmitting a waveform report comprising at least a subset of the samples of the waveform to enable a receiving device to recreate the waveform, wherein the time domain samples in the waveform report include samples of the waveform of a signal as received by the wireless device, prior to the wireless device performing a Fast Fourier Transform (FFT), the frequency domain samples in the waveform report include samples of the waveform of the signal after the wireless device performs an FFT on the signal to transform the signal into a frequency domain, and the wireless device discards a cyclic prefix of the signal prior to performing the FFT and taking the frequency domain samples.

2. The method of claim 1, wherein identifying the set of reporting parameters comprises:
    identifying at least one receive antenna of the wireless device, at least one port, a bandwidth of the waveform, an oversampling rate, or any combination thereof.

3. The method of claim 1, further comprising:
    processing the samples to generate a combined received energy, wherein the waveform report indicates the combined received energy.

4. The method of claim 1, wherein generating the samples of the waveform comprises:
    generating the samples of the waveform before or after performing UE processing.

5. The method of claim 4, wherein the waveform report indicates whether the samples are generated before or after performing the UE processing.

6. The method of claim 4, wherein the UE processing comprises a channel estimation, pilot descrambling, removing a cyclic prefix, or a combination thereof.

7. The method of claim 1, wherein the waveform includes a positioning reference signal.

8. The method of claim 1, wherein the waveform report indicates at least one reporting parameter of the set of reporting parameters, wherein the at least one reporting parameter is a bitwidth of the samples, a total number of the samples, a number and identity of one or more base stations, a number and identity of one or more transmit points, or a combination thereof.

9. The method of claim 1, wherein the waveform report comprises information generated by processing the samples of the waveform.

10. The method of claim 1, wherein the waveform report indicates whether the samples are generated using a staggered comb or a de-staggered comb.

11. The method of claim 1, wherein generating the samples of the waveform comprises:
    generating the samples of the waveform on up to each symbol of a set of symbols of the waveform, on up to each tone of a set of tones of the waveform, or both.

12. The method of claim 1, wherein identifying the set of reporting parameters comprises:
    receiving control signaling indicating a first parameter in the set of reporting parameters.

13. The method of claim 12, wherein identifying the set of reporting parameters comprises:
    determining a second reporting parameter in the set of reporting parameters based at least in part on the first parameter.

14. The method of claim 1, wherein identifying the set of reporting parameters comprises:
    selecting, by the wireless device, each reporting parameter in the set of reporting parameters.

15. The method of claim 1, wherein generating the samples of the waveform comprises:
    selecting a location of a direct current (DC) tone of the wireless device; and
    generating the samples of the waveform based at least in part on the selected location of the DC tone.

16. The method of claim 15, wherein the waveform report indicates a tone index or a tone frequency of the DC tone with respect to a reference point.

17. The method of claim 1, further comprising:
    determining that a second waveform does not arrive within a cyclic prefix of the waveform corresponding to a first fast Fourier transform window for generating the samples of the waveform; and
    generating second samples of the second waveform using a second fast fourier transform window that is offset from the first fast Fourier transform window, wherein the waveform report is generated based at least in part on the second samples.

18. The method of claim 1, wherein generating the samples of the waveform comprises:
suspending or reducing a frequency of making timing corrections for a time period corresponding to a periodic reporting of the samples of the waveform.

19. The method of claim 1, wherein generating the samples of the waveform comprises:
correcting timing prior to a time period corresponding to generating the samples of the waveform, wherein the waveform report indicates a timing adjustment for at least one sample of the samples of the waveform.

20. The method of claim 1, further comprising:
suspending a debugging log or channel state information reporting for at least a time period corresponding to generating the samples of the waveform.

21. A method for wireless communications, comprising:
transmitting a waveform reporting request instructing a wireless device to measure a waveform;
transmitting the waveform;
receiving, from the wireless device, a waveform report comprising samples of the waveform that is generated based at least in part on a set of reporting parameters for sampling the waveform, wherein the samples are time domain samples, frequency domain samples, or both, wherein the time domain samples in the waveform report include samples of the waveform of a signal as received by the wireless device, prior to the wireless device performing a Fast Fourier Transform (FFT), the frequency domain samples in the waveform report include samples of the waveform of the signal after the wireless device performs an FFT on the signal to transform the signal into a frequency domain, and the wireless device discards a cyclic prefix of the signal prior to performing the FFT and taking the frequency domain samples; and
recreating the waveform based at least in part on the samples of the waveform.

22. The method of claim 21, wherein the waveform includes a positioning reference signal.

23. The method of claim 21, wherein the waveform report indicates at least one reporting parameter of the set of reporting parameters for sampling of the waveform.

24. The method of claim 21, further comprising:
determining a location of the wireless device based at least in part on the waveform report.

25. The method of claim 21, further comprising:
processing the samples of the waveform included in the waveform report based at least in part on a direct current (DC) tone indicated by the waveform report.

26. An apparatus for wireless communications by a wireless device, comprising:
a processor, memory in electronic communication with the processor; and
instructions stored in the memory and executable by the processor to cause the apparatus to:
receive a waveform reporting request instructing the wireless device to measure a waveform;
identify a set of reporting parameters for sampling the waveform;
generate samples of the waveform based at least in part on the set of reporting parameters, wherein the samples are time domain samples, frequency domain samples, or both; and
transmit a waveform report comprising at least a subset of the samples of the waveform to enable a receiving device to recreate the waveform, wherein the time domain samples in the waveform report include samples of the waveform of a signal as received by the wireless device, prior to the wireless device performing a Fast Fourier Transform (FFT), the frequency domain samples in the waveform report include samples of the waveform of the signal after the wireless device performs an FFT on the signal to transform the signal into a frequency domain, and the wireless device discards a cyclic prefix of the signal prior to performing the FFT and taking the frequency domain samples.

27. The apparatus of claim 26, wherein the instructions are further executable by the processor to cause the apparatus to:
identify at least one receive antenna of the wireless device, at least one port, a bandwidth of the waveform, an oversampling rate, or any combination thereof.

28. An apparatus for wireless communications, comprising:
a processor, memory in electronic communication with the processor; and
instructions stored in the memory and executable by the processor to cause the apparatus to:
transmit a waveform reporting request instructing a wireless device to measure a waveform;
transmit the waveform;
receive, from the wireless device, a waveform report comprising samples of the waveform that is generated based at least in part on a set of reporting parameters for sampling the waveform, wherein the samples are time domain samples, frequency domain samples, or both, wherein the time domain samples in the waveform report include samples of the waveform of a signal as received by the wireless device, prior to the wireless device performing a Fast Fourier Transform (FFT), the frequency domain samples in the waveform report include samples of the waveform of the signal after the wireless device performs an FFT on the signal to transform the signal into a frequency domain, and the wireless device discards a cyclic prefix of the signal prior to performing the FFT and taking the frequency domain samples; and
recreate the waveform based at least in part on the samples of the waveform.

29. The apparatus of claim 28, wherein the instructions are further executable by the processor to cause the apparatus to:
determine a location of the wireless device based at least in part on the waveform report.

* * * * *